United States Patent
Parasnis et al.

(10) Patent No.: US 12,217,340 B1
(45) Date of Patent: Feb. 4, 2025

(54) MULTI-LAYER PRE-GENERATED CONTENT

(71) Applicant: Typeface Inc., Palo Alto, CA (US)

(72) Inventors: Abhay Parasnis, Palo Alto, CA (US); Vishal Sood, Palo Alto, CA (US); Jonathan Moreira, Palo Alto, CA (US); Sripad Sriram, Palo Alto, CA (US); Hari Krishna, Palo Alto, CA (US); Frank Chen, Palo Alto, CA (US); Perraju Bendapudi, Palo Alto, CA (US)

(73) Assignee: Typeface Inc., Palo Alto, CA (US)

( * ) Notice: Subject to any disclaimer, the term of this patent is extended or adjusted under 35 U.S.C. 154(b) by 0 days.

(21) Appl. No.: 18/783,413

(22) Filed: Jul. 25, 2024

Related U.S. Application Data

(60) Provisional application No. 63/637,254, filed on Apr. 22, 2024, provisional application No. 63/611,006, filed on Dec. 15, 2023, provisional application No. 63/637,258, filed on Apr. 22, 2024, provisional application No. 63/637,266, filed on Apr. 22, 2024, provisional application No. 63/644,385, filed on May 8, 2024, provisional application No. 63/637,275, filed
(Continued)

(51) Int. Cl.
*G06T 11/60* (2006.01)
(52) U.S. Cl.
CPC .......... *G06T 11/60* (2013.01); *G06T 2200/24* (2013.01)
(58) Field of Classification Search
CPC ...................... G06T 11/60; G06T 2200/24
See application file for complete search history.

(56) References Cited

U.S. PATENT DOCUMENTS

| | | |
|---|---|---|
| 11,417,085 B2 | 8/2022 | Saraee et al. |
| 11,809,688 B1 | 11/2023 | Parasnis et al. |
| 11,922,541 B1 | 3/2024 | Parasnis et al. |

(Continued)

FOREIGN PATENT DOCUMENTS

| | | |
|---|---|---|
| WO | WO-2024167650 A1 | 8/2024 |
| WO | WO-2024167651 A1 | 8/2024 |

OTHER PUBLICATIONS

Oppenlaender, Jonas, "Prompt engineering for text-based generative art", arXiv preprint, (Apr. 20, 2022), 7 pgs.
(Continued)

*Primary Examiner* — Michelle L Sams
(74) *Attorney, Agent, or Firm* — Schwegman Lundberg & Woessner, P.A.

(57) ABSTRACT

Methods, systems, and computer programs are presented for the generation of content in advance to enable quickly customized communications for multiple types of customers. One method includes an operation for identifying components of an image design that specifies how the components are combined to generate an image. For one or more of the identified components, variations of the components are generated using one of several generative artificial intelligence (GAI) models. The method further includes detecting a request, comprising user attributes, for the image. For one or more of the identified components, a respective variation is selected based on the user attributes, and a response image is created utilizing the image design and the one or more selected variations. Further, the response image is presented on a computer user interface.

20 Claims, 13 Drawing Sheets

Related U.S. Application Data on Apr. 22, 2024, provisional application No. 63/637,277, filed on Apr. 22, 2024.

(56) References Cited

U.S. PATENT DOCUMENTS

| | | | |
|---|---|---|---|
| 11,928,319 | B1 | 3/2024 | Parasnis et al. |
| 11,995,803 | B1* | 5/2024 | Karpman ............... G06T 5/70 |
| 2019/0325088 | A1* | 10/2019 | Dubey ............... G06T 11/001 |
| 2020/0273062 | A1 | 8/2020 | Probell |
| 2021/0042796 | A1 | 2/2021 | Khoury et al. |
| 2021/0224858 | A1 | 7/2021 | Khoury et al. |
| 2022/0198779 | A1 | 6/2022 | Saraee et al. |
| 2023/0143430 | A1* | 5/2023 | Vanreusel ............ G06V 30/413 |
| | | | 382/157 |
| 2024/0020863 | A1* | 1/2024 | Zhu ............... G06V 10/774 |
| 2024/0127292 | A1 | 4/2024 | Estes et al. |
| 2024/0129601 | A1 | 4/2024 | Brdiczka et al. |
| 2024/0249318 | A1 | 7/2024 | Spiegel et al. |
| 2024/0256337 | A1* | 8/2024 | Verma ............... G06F 9/5011 |

OTHER PUBLICATIONS

"U.S. Appl. No. 18/783,424, Non Final Office Action mailed Sep. 24, 2024", 20 pgs.

U.S. Appl. No. 18/783,416, Non Final Office Action mailed Oct. 1, 24, 13 pgs.

U.S. Appl. No. 18/783,419, Non Final Office Action mailed Oct. 18, 24, 27 pgs.

Kumar, Madhav, et al., "Generative AI and Personalized Video Advertisements", Available at SSRN 4614118, (2023), 17 pgs.

Smolinski, Pawel, et al., "Towards completely automated advertisement personalization: jan integration of generative AI and information systems", 31st International Conference on Information Systems Development (ISD2023), Lisbon, Portugal (2023), 10 pgs.

Wang, Yuntao, et al., "A Survey on ChatGPT: AI-Generated Contents, Challenges, and Solutions", IEEE Open Journal of the Computer Society, vol. 4 (2023), pp. 280-302.

* cited by examiner

MULTI-LAYER PRE-GENERATED CONTENT

CROSS-REFERENCE TO RELATED APPLICATIONS

This application claims the benefit of U.S. Provisional Patent No. 63/637,254, filed Apr. 22, 2024, and entitled "Multi-Layer Pre-Generated Content;" U.S. Provisional Patent No. 63/611,006, filed Dec. 15, 2023, and entitled "Proactively-Generated Personalized Content Creation;" U.S. Provisional Patent No. 63/637,258, filed Apr. 22, 2024, and entitled "Proactively-Generated Personalized Content Creation;" U.S. Provisional Patent No. 63/637,266, filed Apr. 22, 2024, and entitled "Proactively-Generated Content Creation Based on Tracked Performance;" U.S. Provisional Patent No. 63/644,385, filed May 8, 2024, and entitled "Proactively-Generated Personalized Content Creation;" U.S. Provisional Patent No. 63/637,275, filed Apr. 22, 2024, and entitled "Website Personalization and Interactive Assistant;" and U.S. Provisional Patent No. 63/637,277, filed Apr. 22, 2024, and entitled "Personalized Content Generation." These provisional applications are herein incorporated by reference in their entirety.

TECHNICAL FIELD

The subject matter disclosed herein generally relates to methods, systems, and machine-readable storage media for the generation of personalized content for communication messages.

BACKGROUND

Marketers strive to reach the right person at the right time, via the right channel, with the right message to increase product sales. Marketers also want to present content that is relevant to the recipient of communications in order to increase engagement and grow sales. However, the process of creating content for marketing campaigns is slow and expensive because marketers have to rely on graphic artists and copywriters to generate content to include in the communications. As a result, marketers cannot effectively personalize the messages for all of their audience members at scale.

BRIEF DESCRIPTION OF THE DRAWINGS

Various appended drawings illustrate examples of the present disclosure and cannot be considered limiting its scope.

DETAILED DESCRIPTION

Figure 1:
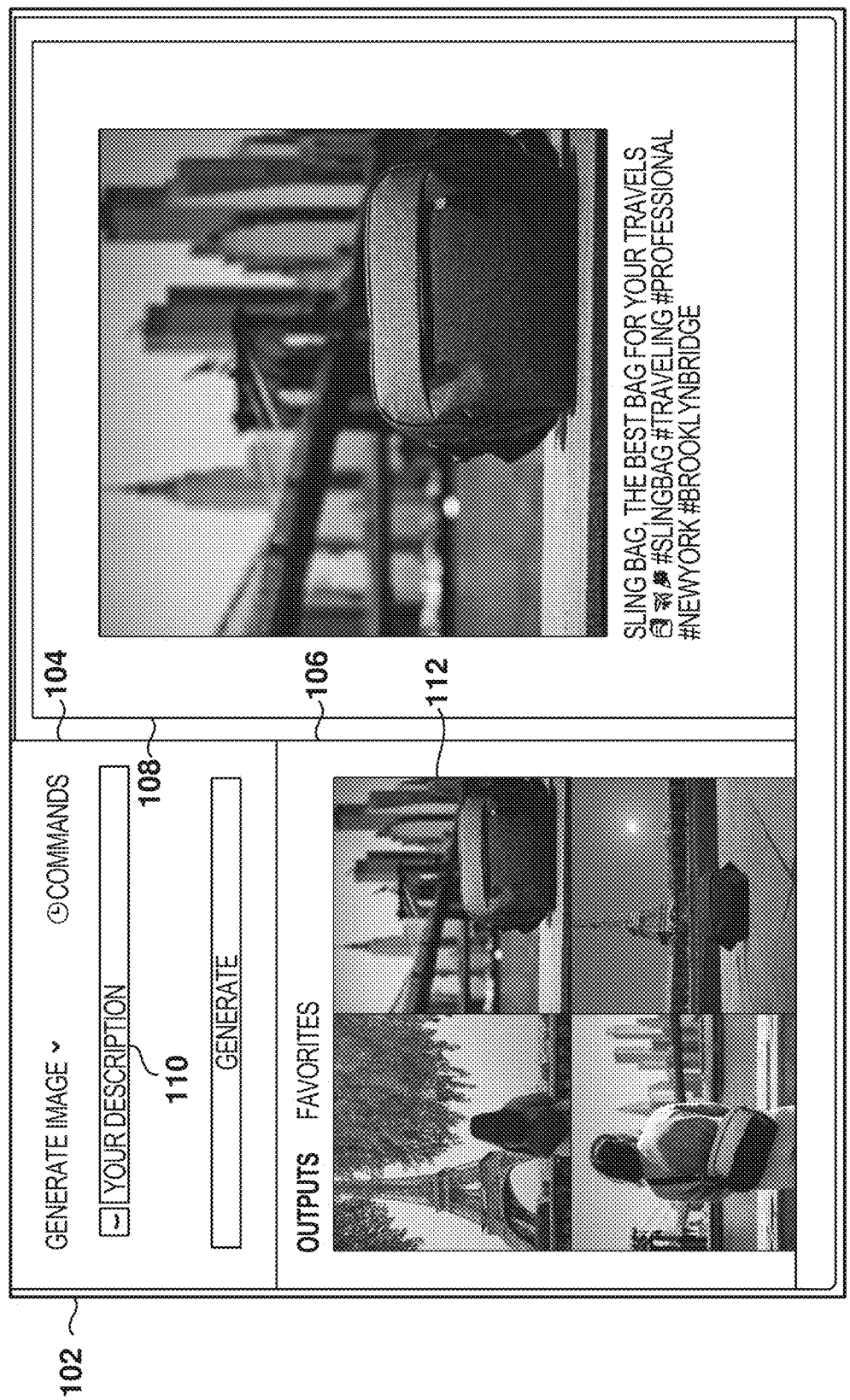
FIG. 1 is a user interface (UI) for a canvas tool to generate multimodal content, according to some examples.

Example methods, systems, and computer programs are directed to the generation of content in advance to enable customized communications for multiple types of customers quickly. Examples merely typify possible variations. Unless explicitly stated otherwise, components and functions are optional and may be combined or subdivided, and operations may vary in sequence or be combined or subdivided. In the following description, numerous specific details are set forth to provide a thorough understanding of examples. However, it will be evident to one skilled in the art that the present subject matter may be practiced without these specific details.

The present disclosure describes a system and method for generating personalized visual creatives for marketing campaigns. The system addresses the challenge faced by marketers in creating visual creatives for various marketing channels, such as display ads and email campaigns.

For example, if a user wants to generate ads that are personalized to an end-user based on the end-user location, the current approach of creating personalized visual creatives is costly and time-consuming, involving the manual creation of multiple creatives and the need to capture location-specific imagery. This manual process requires human intervention to select and insert the appropriate elements that may be incorporated into a template (e.g., an image template defined for Photoshop®, including a title, an image, and a customizable background).

To address these challenges, the present disclosure proposes the utilization of Generative Artificial Intelligence (GAI) tools by a Content-Generation System (CGS), also referred to herein as a content-generation tool. The CGS leverages user information (e.g., location), which is not personally identifiable information (PII), to generate personalized content for visual creatives. By employing GAI models, the CGS can automatically generate relevant backgrounds based on the user's location.

The CGS system leverages GAI to automate the process of pre-generating blocks that may be integrated into a user-defined image template. For example, the CGS generates multiple types of backgrounds and then selects the appropriate pre-generated background when creating a custom visual for a user.

Thus, the present disclosure describes a system and method for generating personalized visual creatives and display ads using GAI techniques. It also introduces a novel approach for pre-generating blocks by analyzing the structure of an image design file and generating content for each block. These innovations offer efficient and streamlined solutions for marketers seeking to create personalized marketing materials.

Glossary of Terms

Some of the concepts used for the description of the solution are presented below.

An asset is a product or service offered for sale. Each asset is associated with a group of asset files and additional metadata that provide information about the asset. The files can be of different types, such as text, image, video, etc. Examples of assets include a pair of shoes, a can of soda, a computer, coffee offered by a coffee shop, and income-tax form preparation services. Assets can be associated with a particular project and can be associated with a particular catalog.

A catalog is a collection of related assets. Each catalog includes one or more assets.

A prompt is text input used to generate new content. The text input includes instructions in a human language that describe the desired output, which may be multi-modal, such as a piece of text, an image, a video, an audio, a piece of programming code, etc., or a combination thereof. Types of prompts include a user prompt and a GAI prompt.

A user prompt is a description entered by a user in plain English (or some other language) of the desired content to be generated. The description may be provided as text or in some other form, such as audio, which is then converted to text. In some examples, the content is generated using Generative Artificial Intelligence (GAI) by inputting the user prompt, or an enhanced prompt based on the user prompt, to a GAI tool, also referred to as the GAI model. An example user prompt is "create an image of product X with a beach background in vibrant colors, where product X takes 30% of the image."

A GAI prompt is a description in plain English (or some other language) of the desired content to be generated by a GAI tool. The GAI prompt is used as the input to the GAI tool, which then generates the desired content. The output of the GAI tool may be multi-modal, such as a piece of text, an image, a video, an audio, a piece of programming code, etc., or a combination thereof.

A canvas is a user interface (UI) that includes one or more fields, including at least a field for entering prompts for the generation of content, a field for showing the generated content, and a field for editing the generated content. The canvas can be associated with a type associated with the desired result, such as an Instagram post, a Facebook post, a Twitter post, a blog post, a Google ad, etc.

A project is a task created by a user with a particular goal (e.g., a marketing goal), such as a Spring Campaign for a new phone release. The project may also be referred to as a campaign. Each project may be associated with one or more canvases and one or more assets.

A publication is a message created for a user, and the message may include one or more blocks of multi-modal content. Examples of publications include a webpage, a text message, an email message, a voice message, an Instagram® message, a blog, an X® message, a Facebook® message, etc.

A canvas template defines the structure of prompts, prompt rules, and other additional context used to generate a canvas.

A publication template defines the structure of prompts, prompt rules, and other additional context used to generate a publication.

A prompt template defines the structure of a GAI prompt used as input to the GAI tool. The prompt template may include fields that may be filled in based on available information to generate the GAI prompt. The prompt template may also include rules for the creation of the GAI prompt (e.g., include specific text when the recipient is an adult, but do not include the text if the recipient is a minor).

Content refers to elements, also referred to herein as blocks, that can be used in messages targeted to users. The elements are multi-modal because they can be of different types, such as a text block, an image, an audio, a video, an Instagram post, a blog post, an email, a social media post, etc. The content can be generated using Generative Artificial Intelligence (GAI) and edited by users. The generated content is new content generated using the GAI tool. It does not refer to content that is the result of editing or changing existing material (e.g., editing an image to add text to the image is not considered generated new content).

FIG. 1 is a UI 102 for a canvas tool, also referred to herein simply as canvas, to generate multimodal content, according to some example embodiments. The UI 102 includes a prompt panel 104, a canvas panel 108, and a variations panel 106.

The prompt panel 104 includes a prompt tool 110 for entering a user prompt, which is descriptive text for the desired results. The prompt tool 110 is more than a simple input field because the prompt tool 110 includes interactive tools for easy entering input.

After input is entered in the prompt tool 110, the CGS generates results in the variations panel 106 with one or more options that the user can select. The results are referred to herein as variations 112 or outputs. In the illustrated example, the input is for generating an image with specific characteristics, and the variations panel 106 shows several variations 112. If the user selects one of the variations 112, the selection is then added to the canvas panel 108. Additional inputs may be entered in the prompt tool 110, and variations may be added to the canvas panel 108.

The CGS is a platform that can generate multiple types of generative content customized for the user and the user's particular environment (e.g., assets, products, services, voice, style, and company of the user). Further, a template-creation tool allows the user to create custom CGS templates to extend and customize the content-generation tool using no-code options that are easy to use. The prompt tool 110 allows the user to express creative ideas naturally and seamlessly integrate with brand assets.

It is noted that examples are presented with reference to marketing-purpose outputs, but the same principles may be used in other environments, such as the generation of documents, contracts, employee newsletters, manuals, instructions, etc. Therefore, the presented examples should not be interpreted as exclusive or limiting but rather as illustrative.

GAI can create new content using existing text, audio files, or images. One of the challenges of GAI is that GAI algorithms need a large amount of training data to perform tasks successfully. Another challenge of GAI is unexpected outcomes, so the CGS has to make sure that the generated results are high-quality and safe to present.

Figure 2:
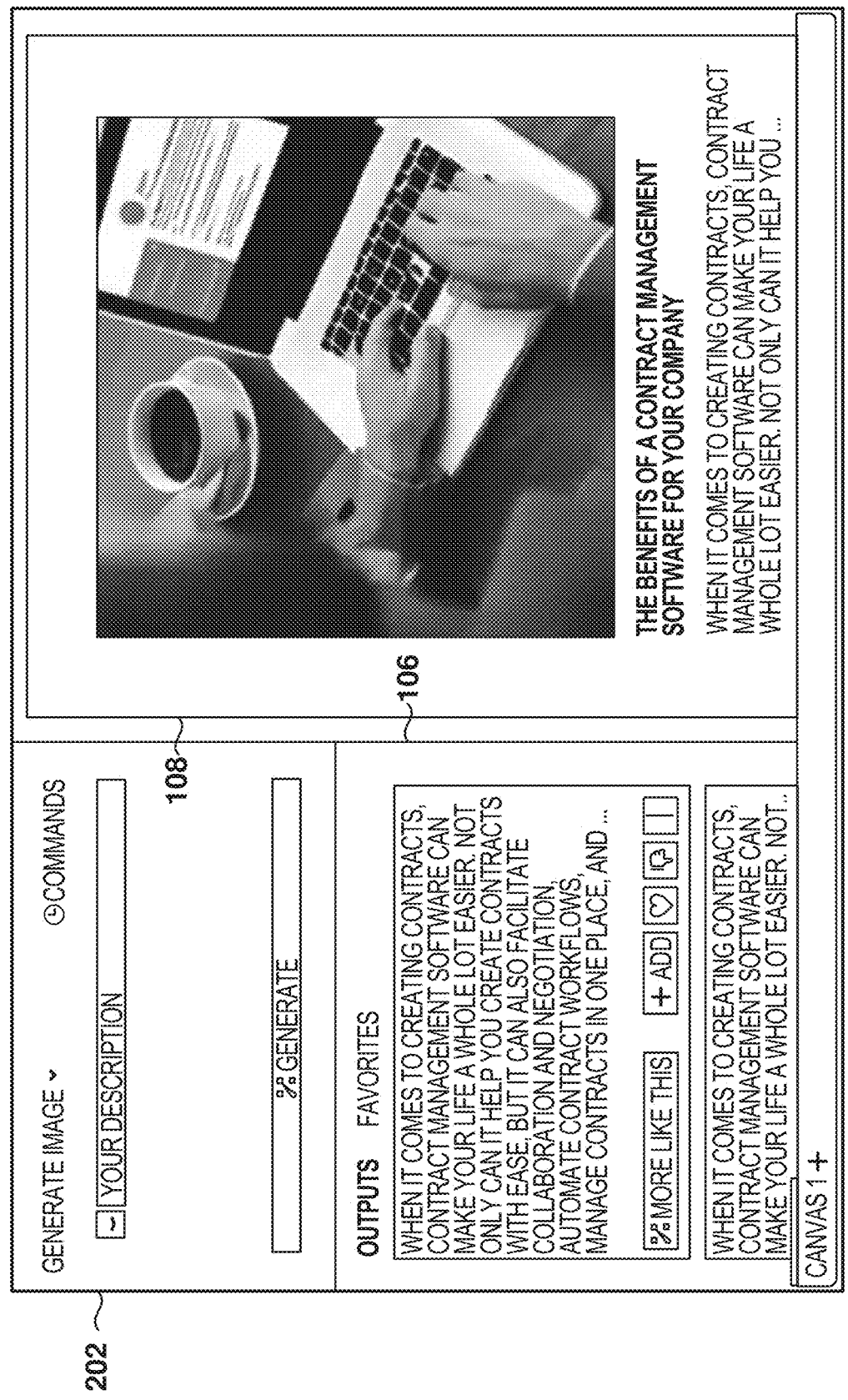
FIG. 2 is a screenshot of multimodal content generated by the content-generation tool, according to some examples.

FIG. 2 is a screenshot 202 of multimodal content generated by the content-generation tool, according to some example embodiments. In the illustrated example, a created image has been selected and is presented in the canvas panel 108.

Further, the user has entered the following user prompt in the prompt tool, "Please write a two-page blog post about the benefits of using contract management software. In your post, discuss how it can help create contracts with ease, facilitate collaboration and negotiation, automate contract workflows, manage contracts in one place, and cover opportunities and risk in trends."

The variations panel 106 shows multiple variations 112 for the blog, and the user has selected one of the generated variations to be added to the canvas panel 108. The different parts of the canvas are editable, including the results and the selected content added to the canvas panel 108. The process may be repeated, adding new variations (text, image, video) to the canvas. That is, the canvas may be generated through a sequence of content-generation requests until the desired outcome is achieved. This sequence of operations may be saved to create a CGS template, and the user may then use the CGS template in the future to generate similar types of material (e.g., a magazine advertisement, a poster for a conference, multimedia presentation).

The content-generation tool also provides a safety feature to ensure that the content generated is safe, meaning that the user's brand is protected from erroneous content (e.g., incorrect product images) and incorrect grammar or plagiarism. The content-generation tool provides a grammar checker and a plagiarism checker to ensure that the generated content is high-quality and safe. Further, the user can specify what type of content is acceptable and what type is not acceptable.

Furthermore, the CGS includes an authenticity checker for the generated image to ensure the asset is always presented correctly. The CGS provides complete brand control to the user and guarantees that the brand is protected.

Figure 3:
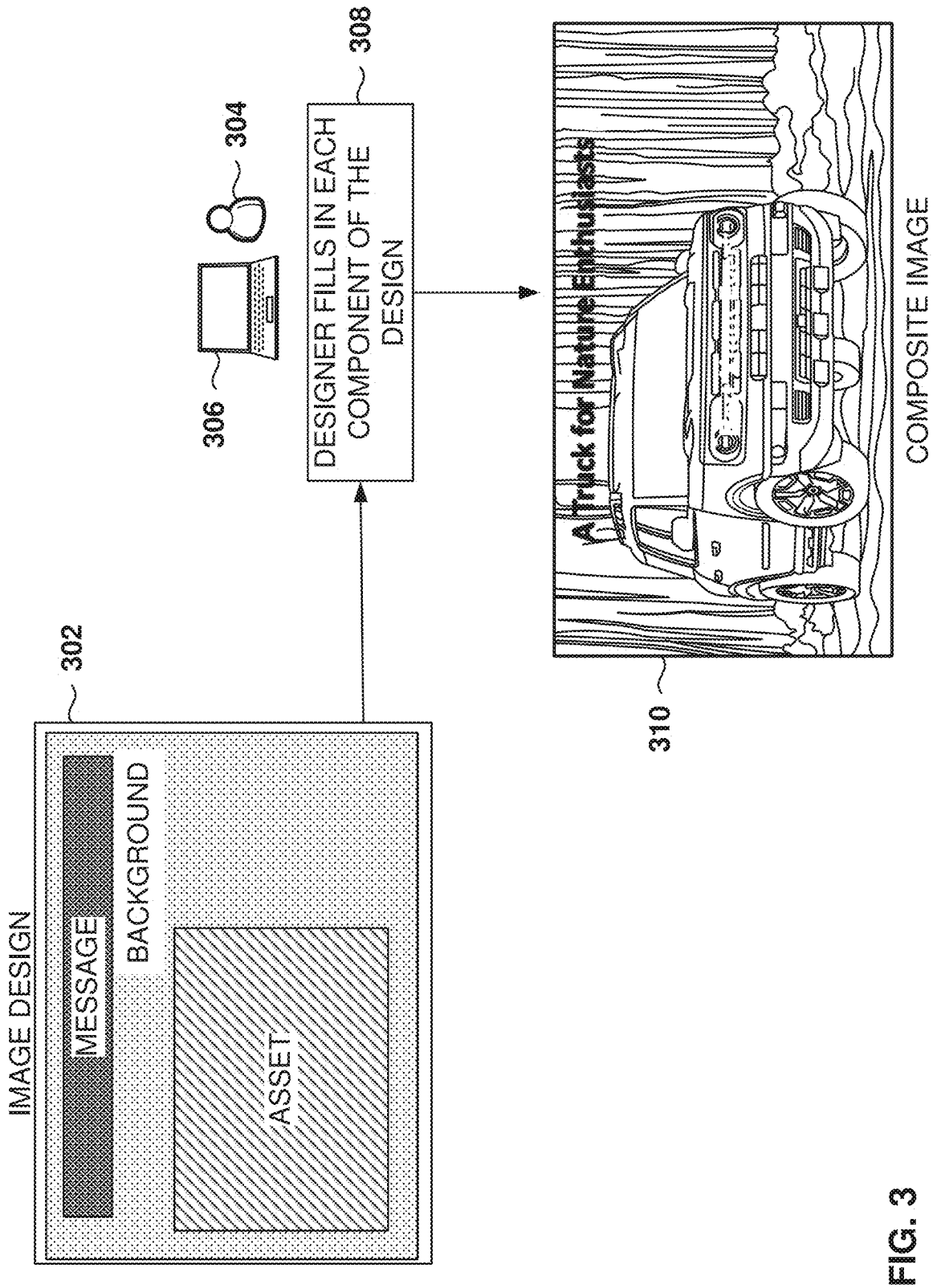
FIG. 3 illustrates the creation of an image based on an image design, according to some examples.

FIG. 3 illustrates the creation of an image 310 based on an image design 302, according to some examples.

Often, marketers employ design tools like Photoshop to create ads manually. Sometimes, the user creates an image design 302 consisting of various components, e.g., the image of an asset, text headline, background image, etc. Marketers 304, using a computing device 306, determine the content for each component and manually combine (operation 308) the created components using the image design 302 to create the image 310.

In the illustrated example, the image design 302 includes the image of an asset (a truck), a message ("A Truck for Nature Enthusiasts"), and a background (a forest). The result is the image of the truck in a forest with the included message.

In this example, the truck company is conducting display ad campaigns on their website, aiming to remind users about their pickup trucks and encourage them to take further action, such as scheduling a test drive or making a purchase. To achieve this, the truck company desires to personalize the display ads based on the user's location. For instance, users in a specific location would see a pickup truck in a scene that is relevant to their location (e.g., wilderness, beach, mountains, city). The objective is to increase the relevance of the creative content and enhance user engagement.

However, the current process of creating personalized visual creatives is costly and time-consuming. It involves capturing location-specific images and integrating them into the display ads, which then need to be distributed across various advertising channels, as shown in operation 308, where the designer fills in each component of the design. This process poses a significant challenge for marketers looking to personalize creatives at scale. For example, it would be quite expensive to have to go around the country and take images of the asset in different scenarios (e.g., photos in Arizona, San Diego, New York, Montana, etc.).

To address this challenge, the CGS leverages user information, such as their location, to automatically generate personalized backgrounds for the visual creatives. By incorporating location-specific elements into the creatives, the system aims to enhance their relevance and increase user interaction.

Further, the CGS may proactively pre-generate some of the blocks so the blocks are ready to be combined for a specific user in real time. For example, the CGS may create twenty or more different backgrounds, thirty or more different messages, and 30 or more different images of the asset, such as trucks with different colors. In some cases, the asset image may be obtained from an existing catalog or asset images. Still, other asset images may be generated by changing the catalog images, such as by changing the color of the asset.

In summary, the disclosed system and method enable marketers to generate personalized visual creatives for marketing campaigns. By leveraging GAI technology and user information, the system aims to enhance the relevance of the creatives and improve user engagement.

Figure 4:
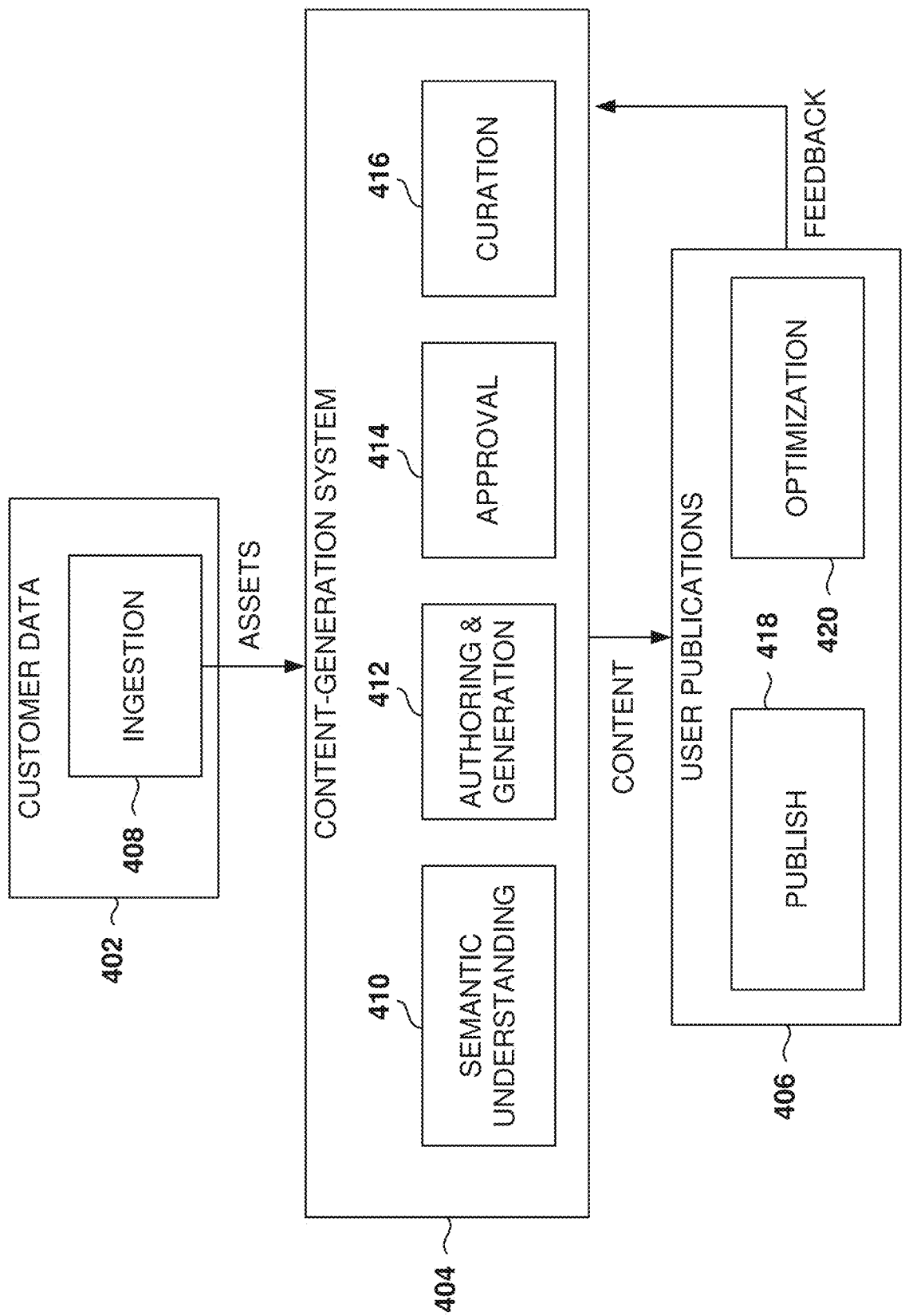
FIG. 4 illustrates the process of publishing generated content and optimizing content over time, according to some examples.

FIG. 4 illustrates the process of publishing generated content and optimizing content over time, according to some examples. The customer data 402 is ingested, at operation 408, to collect information about the assets. The customer may send the information to the CGS 404, or the CGS 404 may proactively download the customer data 402. The customer data may include a website, a database with information about sales and assets, etc.

The CGS 404 extracts semantic understanding from the customer data 402. The process of extracting semantic understanding 410 from customer data involves using advanced algorithms and machine-learning techniques to analyze the data and identify the meaning of the different assets, such as product information, images associated with the different assets, etc.

At operation 412, the CGS 404 generates content that may be used in publications to users, such as images, backgrounds, titles, ad text, etc. Users can approve (operation 414) the content before being used for communications to end users and can curate content they want their end users to see. Further, users may curate (operation 416) the generated content using CGS tools, such as the canvas of FIGS. 1 and 2.

User publications 406 are then published to the end-users. Publish 418 refers to the process of placing personalized content (e.g., a publication) generated by the CGS to a customer-managed property. These properties could be end-user facing (e.g., a website, an ad, an email) or internal to a customer (e.g., a Content Management System).

After a publication is published, the CGS measures the performance of the publication and provides feedback (e.g., user events) that flows back to the CGS 404. This feedback is used to refine content further to optimize (operation 420) the publications in order to maximize a customer-defined business goal, e.g., iteratively refining generated product imagery to increase sales or conversion rates.

Figure 5:
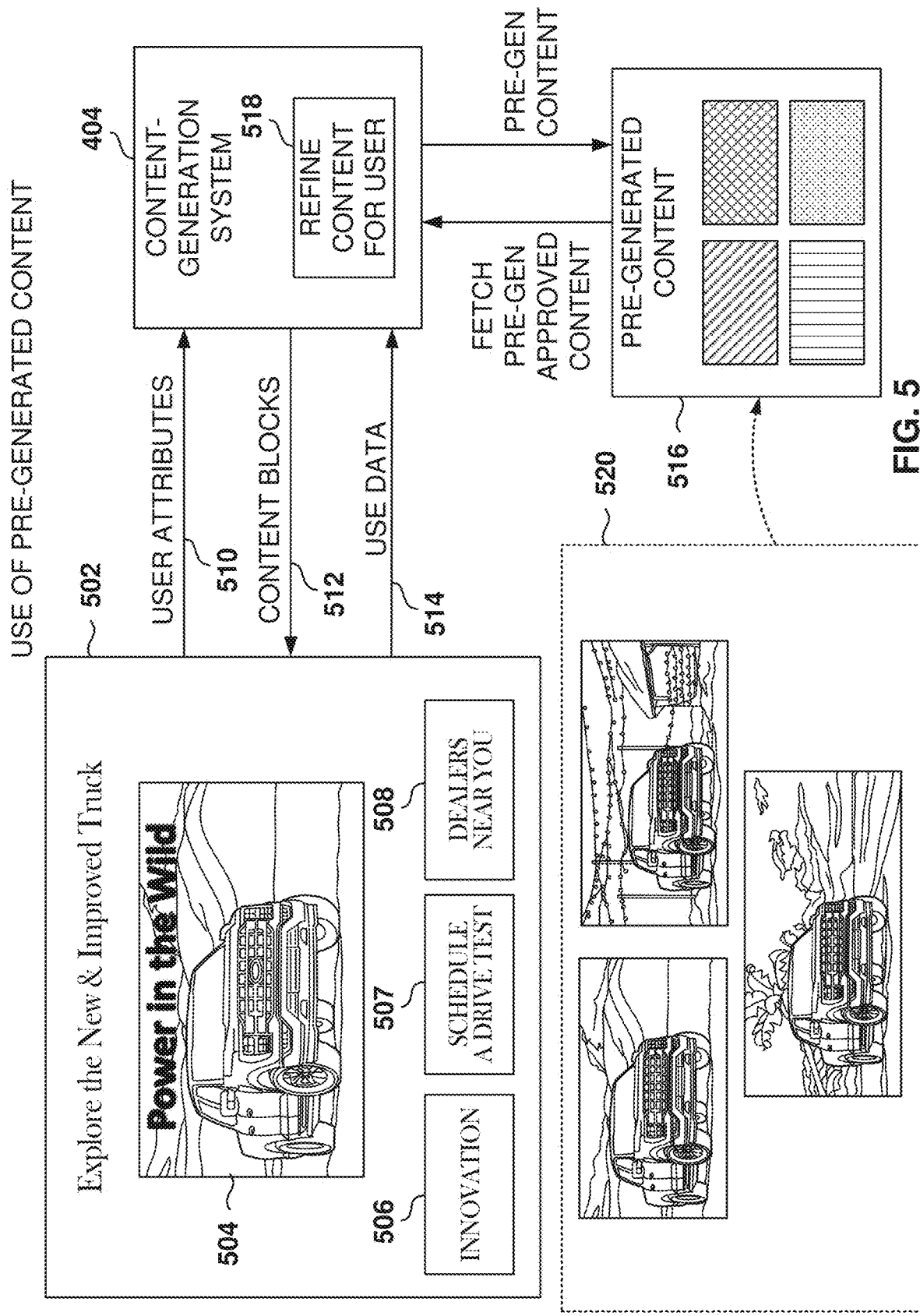
FIG. 5 illustrates the creation of a publication using pre-generated content, according to some examples.

FIG. 5 illustrates the creation of a publication using pre-generated content, according to some examples. There are two types of strategies for publishing content: a pull strategy and a push strategy. In the pull strategy, a website, backend server, or some other system fetches pre-generated content from the CGS 404. In the push strategy, the CGS 404 pushes content to the external system when content is generated or if some other event triggers the transfer.

Further, there are two types of content: the pre-generated content and the real-time-generated content. The pre-generated content is content that is generated beforehand (e.g., before the user submits a request for content), is approved by the user, and is safe (e.g., there are no wrong representations of assets) to deliver to end customers. The real-time-generated content is generated when the content is either pushed or pulled into an external system.

Figure 6:
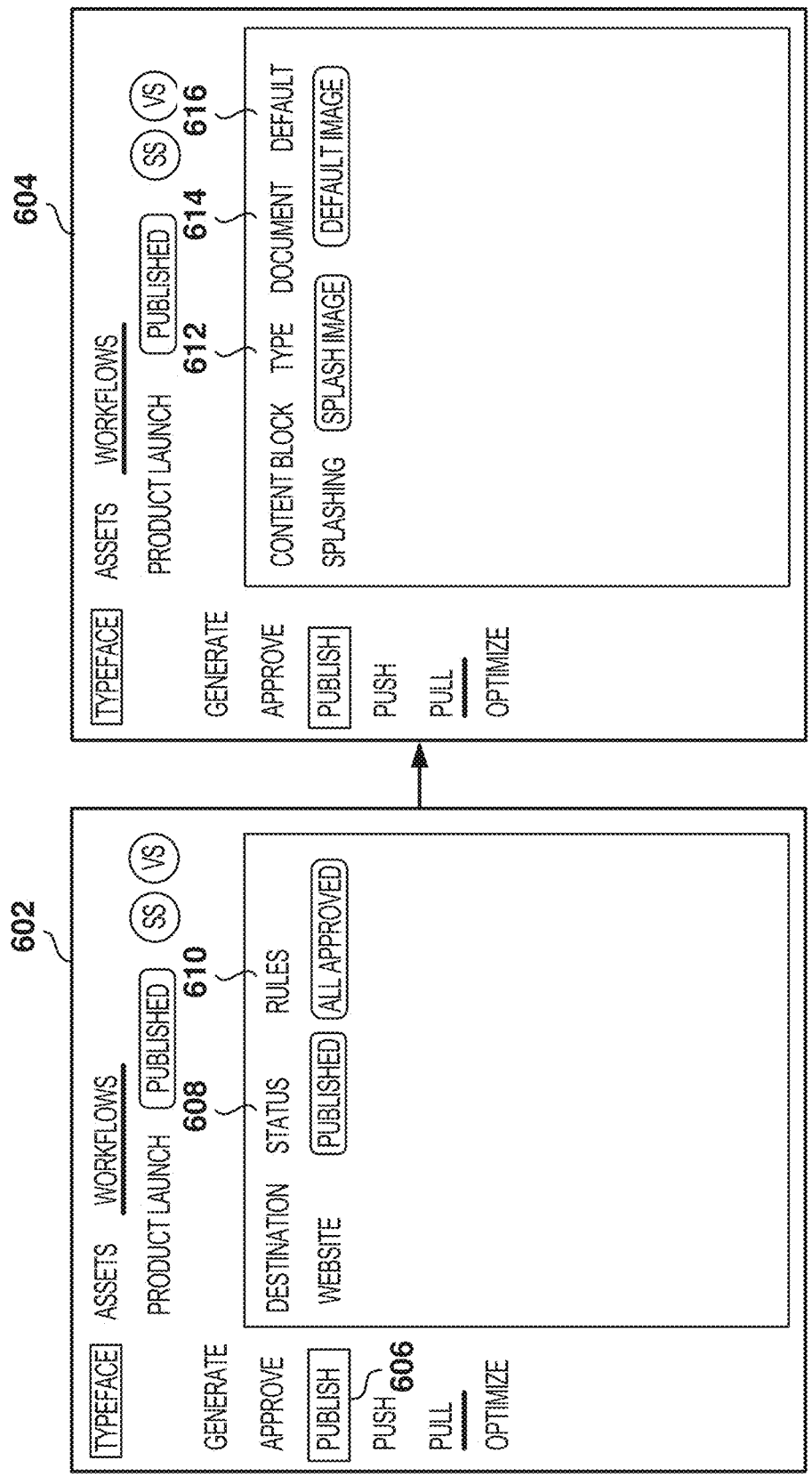
FIG. 6 is an example UI for specifying the creation of content, according to some examples.

FIG. 5 illustrates an example of a pull, pre-generated content. One example of pulling generated content is to update the content of a website dynamically. In one example, a snippet is incorporated into the website, and the snippet fetches (e.g., through client-side API calls) and places the generated content on the webpage. The CGS 404 provides a UI to configure the content blocks to be generated for the website. A sample UI is shown in FIG. 6, but other examples may use other types of UIs.

In the illustrated example, a webpage 502 includes several elements, such as an image 504, and frames 506-508 with different options for the user. When the webpage 502 is loaded, the snippet in the webpage 502 sends a request 510 to the CGS 404 that includes the attributes of the user interfacing with the webpage 502. The request 510 is to fetch the specified content blocks for the webpage 502.

In response, the CGS 404 fetches the blocks of pre-generated content 516 that correspond to the webpage 502. The pre-generated content 516 is content that has been previously generated by the CGS 404.

The CGS 404 optionally refines the fetched pre-generated content before sending 512 the content blocks to the webserver for presentation on the UI of the end-user.

In this example, the webpage 502 includes an image of a truck, and the CGS 404 has pre-generated several images 520 of the truck with different backgrounds and different colors. Based on the user request (e.g., based on the user attributes), one of the images 520 is selected to be loaded into the webpage 502.

In some examples, the pre-generated content 516 includes blocks of the components for the design of the image 504. In this case, the design for the image includes a picture of the asset (e.g., the truck) and a background for the image. At operation 518, the CGS 404 selects one image of the asset and one background and combines them into the image that is then sent to the web server.

Further, the web server sends use data 514 about interactions of users with the webpage 502, and this use data 514 is used by the CGS 404 to optimize content delivery to maximize some business goal (e.g., increase sales).

By leveraging AI, the disclosed system eliminates the need for manual input and streamlines the process of creating display advertisements. Marketers can simply indicate the desired placement of each component, and the CGS 404 will automatically generate the content to fill in the design template. This automation saves time and effort for marketers, allowing them to focus on other aspects of their advertising campaigns.

FIG. 6 is an example UI 602 for specifying the creation of content, according to some examples. The UI 602 includes publish options 606 to specify how the content blocks are to be used to build the webpage.

The UI 602 includes option 608 regarding the status of the destination webpage (e.g., under design, published) and rules 610 for publication (e.g., automatically use pre-generated content, need pre-authorization to publish pre-generated content.

UI 604 shows details on the content blocks to build a webpage, such as type 612 of block (e.g., text, image, audio, video), document 614 for webpage (e.g., splash image, contact-us block, about-us block, web title), and default element 616 (e.g., a default image of a truck to be used when user information is not available).

Figure 7:
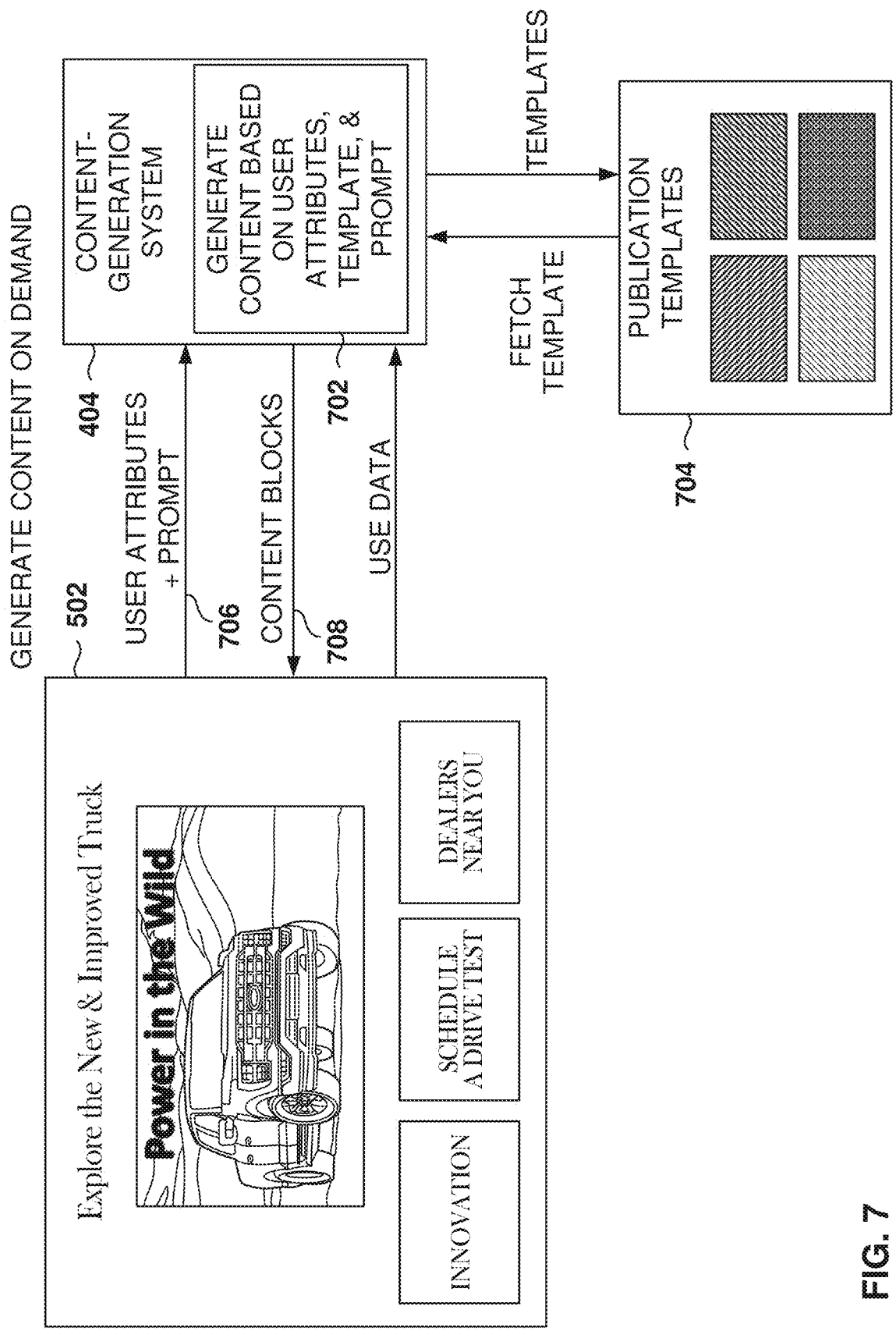
FIG. 7 illustrates an example of generating content on demand.

FIG. 7 illustrates an example of generating content on demand, e.g., pull, real-time generated content. To build the webpage 502, the pre-generated content, a combination of pre-generated content with content created on demand, or exclusively the content generated on demand may be used.

The webpage 502 is the same webpage described above with reference to FIG. 6. When the webpage is loaded, the snippet sends the request 706 to the CGS 404 with the attributes of the user interfacing with the webpage as well as a CGS prompt to generate the content.

The CGS 404 fetches the publication template 704 to satisfy the request. Examples of publication templates 704 include a webpage, an Instagram post, a social media post, a web ad, and a blog post.

At operation 702, the CGS 404 generates the content using the user attributes, the CGS prompt, and the selected publication template. Once all the elements that go into the publication template are generated, the CGS 404 sends (operation 708) the selected content blocks to the webserver for presentation on the webpage for the user.

In one example, the generated content includes the title message, the image of the asset (e.g., truck), the background for the image, and information on dealers near the location of the user. Other blocks, such as the Innovation and Schedule a Drive Test, may be static in one example and do not need to be generated.

Figure 8:
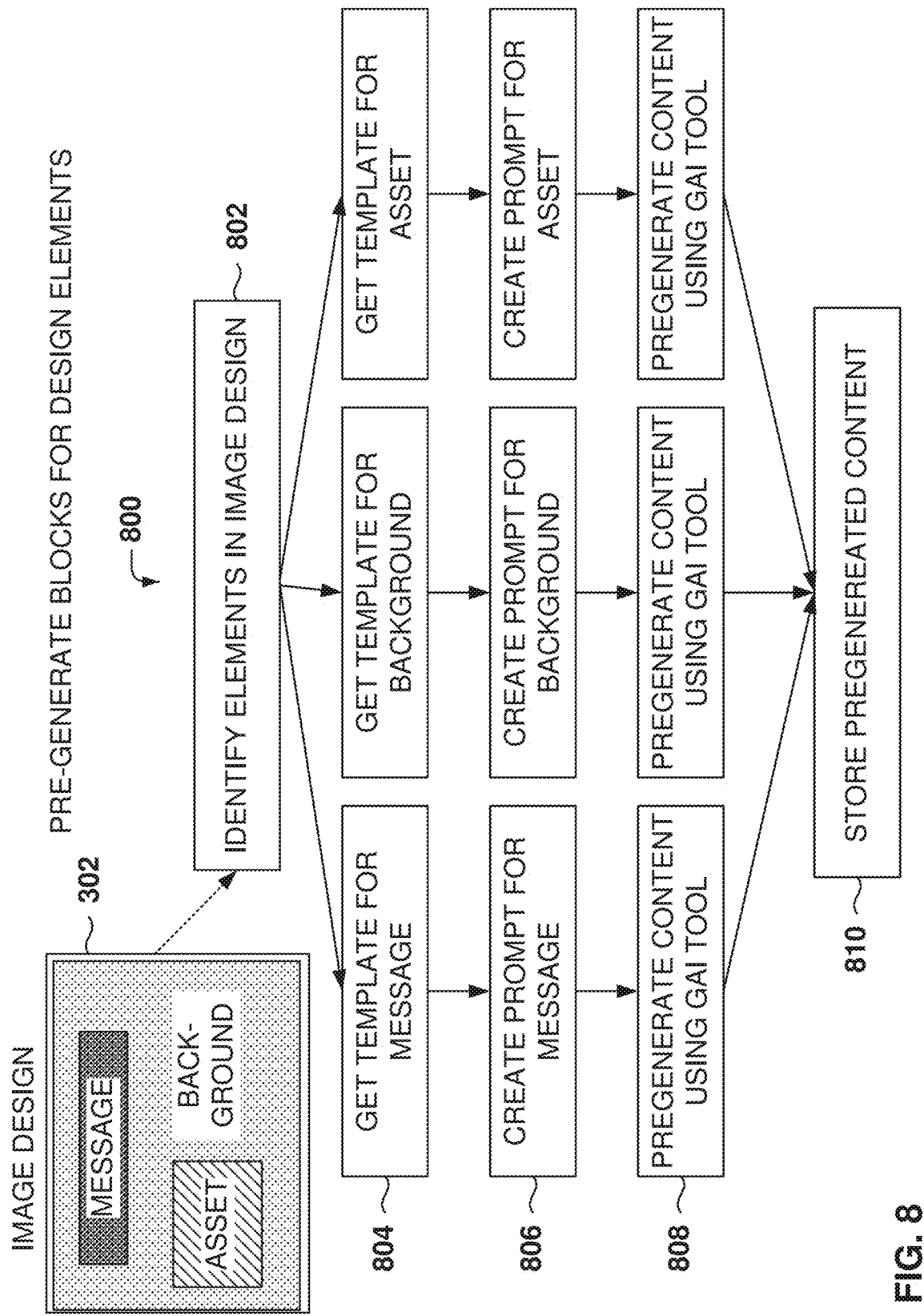
FIG. 8 is a flowchart of a method for pre-generating content blocks, according to some examples.

FIG. 8 is a flowchart of a method 800 for pre-generating content blocks, according to some examples. As discussed above with reference to FIG. 3, an image design includes several components. In this example, the image design 302 includes the image of an asset, a message, and a background. The result of combining the elements is the image that may be used for a publication. Although an image design with three elements is illustrated, other examples may include a different number of elements, e.g., in the range from 1 to 50.

At operation 802, the elements that compose the image design 302 are identified. From operation 802, the method continues on three separate threads that may be performed sequentially or in parallel (as shown), one thread for each component of the image design 302.

At operation 804, the prompt template for the message is obtained. From operation 804, the method 800 flows to operation 806 to create a GAI prompt for creating the message.

From operation 806, the method flows to operation 808 to pre-generate the message using the GAI prompt and a GAI tool. The other two threads operate similarly, except they are customized for the background and the asset.

Once all the elements are pre-generated, at operation 810, the pre-generated content is stored in a memory. The pre-generated content may be stored separately or as a combined publication.

It is noted that although the method 800 has been illustrated for an image design, the same principles may be used for other types of documents, such as text documents (e.g., title, abstract, and body), audio files, etc.

Figure 9:
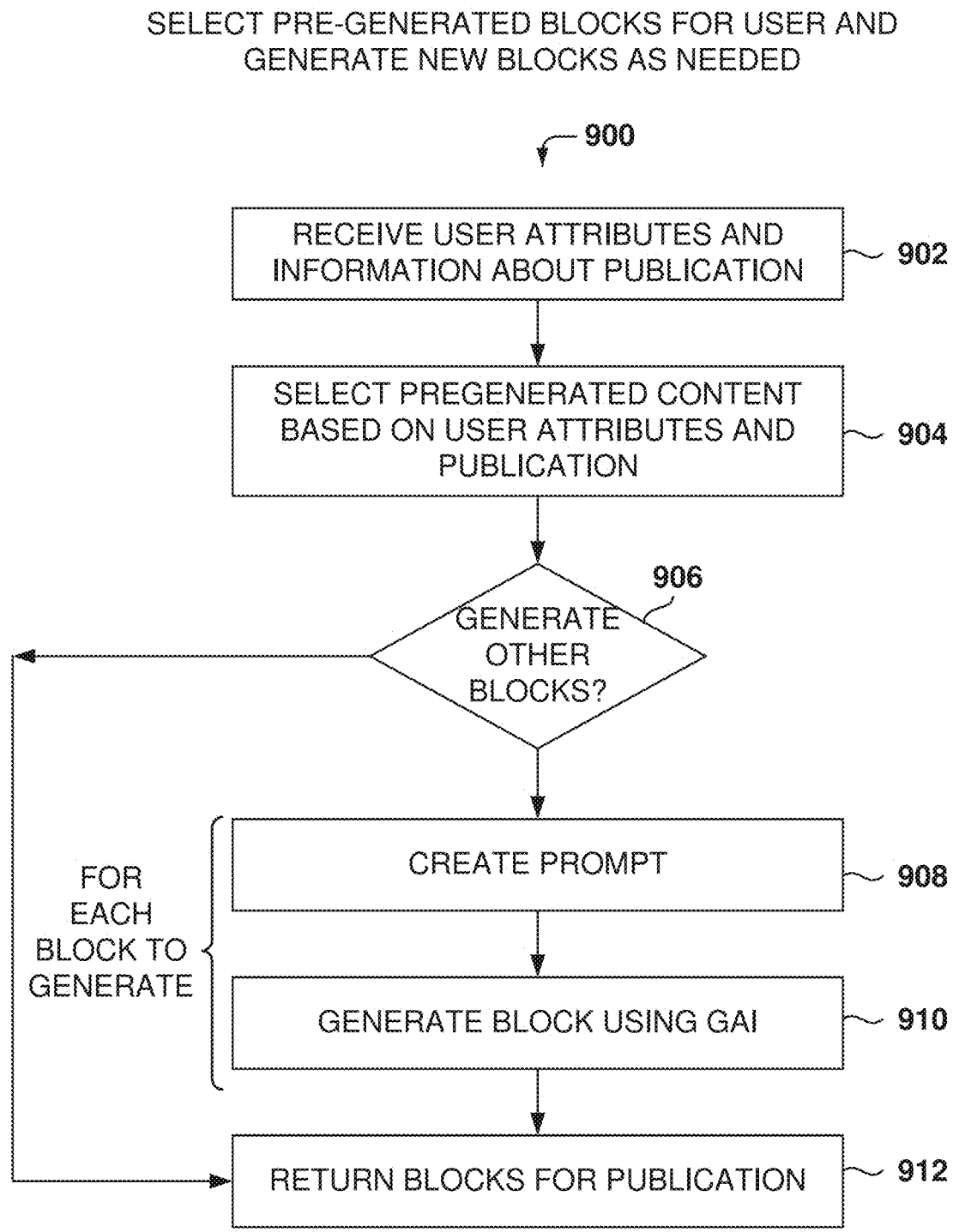
FIG. 9 is a flowchart of a method for combining blocks generated on demand with pre-generated content blocks, according to some examples.

FIG. 9 is a flowchart of a method 900 for combining blocks generated on demand with pre-generated content blocks, according to some examples. While the various operations in this flowchart are presented and described sequentially, one of ordinary skill will appreciate that some or all of the operations may be executed in a different order, combined, omitted, or executed in parallel.

At operation 902, the CGS 404 receives the user attributes and information about the publication that is to be published.

From operation 902, the method 900 flows to operation 904, where the CGS 404 selects pre-generated content based on the user attributes and the type of publication. The selected pre-generated content may include several blocks that may be combined to create the publication.

At operation 906, a check is made to determine if other blocks need to be generated. If other blocks need to be generated, the method 900 flows to operation 908, and if other blocks are not needed, then the method 900 flows to operation 912.

Operations 908 and 910 are performed for each block that needs to be generated. At operation 908, a GAI prompt is created, and at operation 910, the block is generated using the GAI prompt and the GAI tool.

At operation 912, all the blocks (the pre-generated blocks and the generated blocks, if any) are returned for publication.

Figure 10:
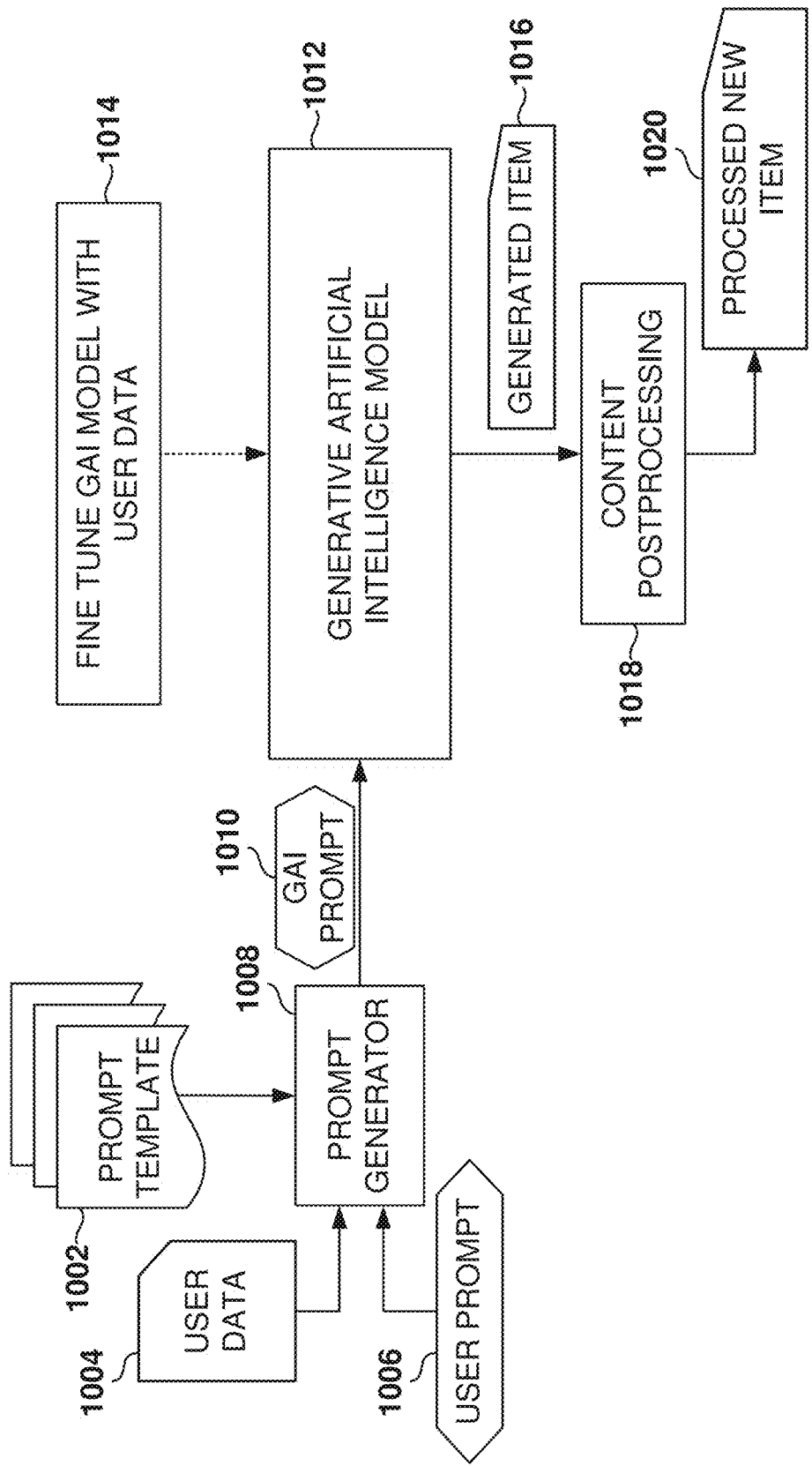
FIG. 10 illustrates the use of a Generative Artificial Intelligence (GAI) model to generate new content, according to some examples.

FIG. 10 illustrates the use of a Generative Artificial Intelligence (GAI) model 1012 to generate new content, according to some examples. GAI is a type of AI that can generate new content, such as images, text, video, or audio. The GAI model 1012 is trained on large datasets of data and uses this data to learn the patterns and relationships between different elements of the data. There are several types of GAI models, such as Generative Adversarial networks (GANs), Variational Autoencoders (VAEs), and Autoregressive models.

The GAI models generate items of different types, such as GAI models for creating text (e.g., GPT-4, Pathways Language Model 2 (PaLM 2), LaMDA), images (e.g., DALL-E 2, Stable Diffusion), videos (Runway Gen-2, Stable Diffusion Video), audio (e.g., Google MusicLM, Stable Audio), etc.

Often, the companies that create the GAI models make the GAI models available to users who can apply them to generate the desired content based on a GAI prompt 1010 provided to the GAI model 1012. Users can utilize the GAI model 1012 as provided by the vendor or can optionally fine-tune 1014 the GAI model 1012 with their user data to adjust the parameters of the GAI model 1012 in order to improve performance on a specific task or domain.

In some examples, fine-tuning the GAI model 1012 includes the following operations:
1. Collect user data: Gather a collection of user data that is relevant to the target task or domain. This data could include text, images, audio, or other types of data;
2. Label the data: if the task requires supervised learning, the user data is labeled with the correct outputs;
3. Select a fine-tuning method. Some of the methods for fine-tuning GAI models include Full fine-tuning, Few-shot fine-tuning, and Prompt-based fine-tuning;
4. Train the GAI model 1012: Perform incremental training of the tune 1014 using the selected fine-tuning method and
5. Optionally, evaluate the performance of the fine-tuned model on a held-out dataset.

The GAI model 1012 can be used to generate new content based on the GAI prompt 1010 used as input, and the GAI model 1012 creates a newly generated item 1016 as output.

The GAI prompt 1010 is a piece of text or code that is used to instruct the GAI model 1012 towards generating a desired output (e.g., generated item 1016). The GAI prompt 1010 provides context, instructions, and expectations for the output. The newly generated item 1016 may be multi-modal, such as a piece of text, an image, a video, an audio, a piece of programming code, etc., or a combination thereof.

Prompt engineering is the process of designing and crafting prompts to effectively instruct and guide a GAI model toward generating desired outputs. It involves selecting and structuring the text that forms the GAI prompt 1010 input to the GAI model 1012, ensuring that the GAI prompt 1010 accurately conveys the task, context, and desired style of the output.

A prompt generator 1008 is a computer program that generates the GAI prompt 1010. There are several ways to generate the GAI prompt 1010. In one example, the prompt generator 1008 may use a user prompt 1006 entered by the user in plain language as the GAI prompt 1010. In other examples, the prompt generator 1008 creates the GAI prompt 1010 without having a user prompt 1006, such as by using a static pre-generated prompt based on the desired output.

In other examples, the prompt generator 1008 uses a prompt template 1002 to generate the GAI prompt 1010. The prompt template 1002 defines the structure of the GAI prompt 1010 and may include fields that may be filled in based on available information to generate the GAI prompt, such as user data 1004 or the user prompt 1006. The prompt template may also include rules for the creating of the GAI prompt (e.g., include specific text when the recipient resides in California, but do not include the text if the recipient does not reside in California). In other examples, the prompt generator 1008 uses heuristics codified into a computer program to generate the GAI prompt 1010.

An example template for generating a prompt to create an image for a marketing campaign is as follows:

You are an AI Assistant that will help create prompts that can be used to generate images with Dall-e and stable diffusion.

The user can provide information as input for generation:
1. Product or service information (e.g., selling t-shirts)
2. Goal—Example—I want to run a promotion for Halloween
3. Audience Information-Location, Gender, Demographics, Age group
4. Channel-Email, Instagram, TikTok, etc.

Use the above information in the following way to generate the prompt.
Product Information:
  Clearly highlight the main product.
  Example: "A t-shirt"
Goal:
  Incorporate the objective or theme of the promotion.
  Example: "with a unique Halloween-themed design"
Audience Information:
  Add elements that resonate with the target audience's location, gender, demographics, and age group. Ensure the depiction is inclusive and diverse.
  Example (based on hypothetical audience info): "being worn by a young male from Italy in his 20s"
Channel:
  Tailor the style and format based on the channel you're targeting. For instance:
  Email: A more detailed and descriptive scene as it's viewed on larger screens.
  Instagram: Focus on aesthetics and vibrant visuals.
  TikTok: Dynamic and engaging visuals, perhaps hinting at movement or a narrative.
  Example (for Instagram): "The setting is a moonlit night in an Italian piazza, where the young man joins friends for a Halloween celebration. The atmosphere is festive with jack-o'-lanterns, cobblestone streets, and ancient buildings in the background. The image is vibrant and aesthetically pleasing, perfect for an Instagram post."

Final Prompt:

"A t-shirt with a unique Halloween-themed design being worn by a young male from Italy in his 20s. The setting is a moonlit night in an Italian piazza, where the young man joins friends for a Halloween celebration. The atmosphere is festive with jack-o'-lanterns, cobblestone streets, and ancient buildings in the background. The image is vibrant and aesthetically pleasing, perfect for an Instagram post."

Remember, this is just one example. Depending on the specifics of the audience information and the chosen channel, the prompt can be tailored differently. The idea is to incorporate all the provided details into a cohesive and engaging narrative for the image.

Creating a good prompt structure for generating images with models like DALL·E or Stable Diffusion requires a balance of specificity and creativity. Here's a breakdown of the essential elements and how you can structure them:

1. Type of Image: Start by specifying the format or medium of the image. For example:
   Photo
   Oil painting
   Watercolor painting
   Illustration
   Cartoon
   Drawing
   Vector
   Render
2. Main Subject: Clearly identify the primary focus or subject of the image. Be as specific as you can. Instead of "bird," say "a crimson-feathered parrot."
3. Action or State: Describe what the subject is doing or the state it's in. For instance, "soaring through a clear blue sky" or "perched on a wooden branch."
4. Setting or Background: Provide context by describing the environment or setting. This could be "a bustling city square," "a serene lakeside," or "a starry night."
5. Additional Details: Enhance the scene with additional elements or props. These can be objects, secondary characters, or even weather conditions. For example, "with children flying kites" or "as rain gently falls."
6. Mood or Atmosphere: If you have a particular mood or tone in mind, specify it. Words like "sunset," "dreamy," "nostalgic," or "futuristic" can guide the generation.
7. Diversity and Representation: Especially for images with people, ensure that you specify diverse gender, racial, and other representations to avoid unintentional biases.
8. Perspective and Orientation: Mention if you want a specific viewpoint like "bird's eye view" or "close-up." Also, if the image should be "wide" (landscape) or "tall" (portrait), include that.

Here's a structured example:

"Photo of a diverse group of young people sitting around a campfire in a dense forest at twilight, laughing and sharing stories, with sparks from the fire rising into the starry night."

Remember, while it's essential to be specific to guide the model, leaving a bit of room for creativity can lead to surprising and delightful results. Adjust the level of detail based on the desired outcome.

Targeting imagery based on audience demographics like location, gender, and age can enhance the effectiveness of the visual content. Here's how you can tailor image prompts to appeal to specific audience attributes:

1. Location:
   Cultural References: Incorporate elements, symbols, or landmarks that resonate with people from that specific region.
   Landscapes & Settings: Use typical settings from the location, such as cityscapes, countryside, beaches, or mountains.
   Color Palette: Some cultures have color preferences based on traditions, seasons, or festivals.
2. Gender:
   Inclusivity:** Ensure representation of all genders. Avoid stereotypes; instead, focus on universal themes or elements that resonate with the target gender.
   Themes & Motifs:** Depending on research and insights, you might incorporate certain themes, patterns, or motifs that appeal to a specific gender.
3. Age:
   Children (below 12 years):
    Style: Cartoons, animations, or illustrations with bright colors.
    Elements: Friendly animals, magical creatures, superheroes, and playful settings.
   Teens (13-19 years):
   Style: Trendy illustrations, digital art, or photographs.
    Elements: Pop culture references, technology, hobbies, and youth-centric activities.
   Adults (20-60 years):
   Style: Realistic photos, classic paintings, or mature illustrations.
   Elements: Daily life, work, family, nature, hobbies, and contemporary themes.
   Seniors (60+ years):
   Style: Vintage or nostalgic imagery, calming watercolors, or serene photos.
   Elements: Nature, landscapes, nostalgia, classical art, and leisure activities.
4. Interests & Hobbies:
   If you have information on the target audience's interests, incorporate elements that resonate with those hobbies or passions.
5. Emotional Appeal:
   Think about the emotion you want to evoke. Children might respond to joy and wonder, teens to aspiration and adventure, adults to connection and nostalgia, and seniors to tranquility and reflection.
6. Narrative & Storytelling:
   Craft a narrative that resonates with the target group. Kids might enjoy a story of adventure, teens a coming-of-age tale, adults a journey of discovery, and seniors a trip down memory lane.

When constructing your prompt, always combine these tailored elements to create a cohesive and appealing image. For instance:

"Cartoon illustration of a magical forest with bright-colored trees, where friendly animals host a picnic for children, with a backdrop of a famous landmark from [Location]."

Remember, while these are general guidelines, individual preferences can vary widely. It's essential to understand your specific audience and adjust the attributes accordingly.

Incorporating channel-specific information into your image prompts is crucial because each platform has its own audience expectations, content style, and purpose. Here's how you can tailor your prompts based on popular social media channels:
1. Instagram:
    Purpose: Primarily visual content; used for personal sharing, lifestyle branding, and visual storytelling.
    Prompt Attributes: Focus on aesthetics, vibrant colors, and visually pleasing compositions.
    Example: "Photo of a minimalist workspace with pastel-colored stationery, a succulent plant, and a morning coffee cup, suitable for a lifestyle influencer on Instagram."
2. TikTok:
    Purpose: Short-form video platform known for fun, entertaining, and sometimes educational content.
    Prompt Attributes: Emphasize dynamic, youthful, and trendy elements. Consider popular challenges, dances, or meme formats.
    Example: "Illustration of a diverse group of young people dancing in trendy outfits to a popular song, with vibrant neon lights in the background, perfect for a TikTok dance challenge."
3. LinkedIn:
    Purpose: Professional networking and industry news.
    Prompt Attributes: Prioritize professional, clean, and formal visuals. Showcase industry-related themes, corporate environments, and professional individuals.
    Example: "Photo of a diverse group of professionals in a modern office boardroom, discussing a project with charts and graphs projected on a screen, suitable for a LinkedIn post on teamwork."
4. Twitter:
    Purpose: News, updates, personal opinions, and quick information sharing.
    Prompt Attributes: Go for relevant, timely, and sometimes witty or satirical visuals. Infographics or concise visuals work well.
    Example: "Illustration of a bird (representing Twitter) perched on a globe, tweeting out news headlines, ideal for a tweet about current global events."
5. Facebook:
    Purpose: Personal updates, news sharing, and community interactions.
    Prompt Attributes: Focus on relatable, family-friendly, and community-centric visuals.
    Example: "Photo of a community event in a local park, with families enjoying a barbecue and kids playing games, fitting for a Facebook community group post."
6. Pinterest:
    Purpose: Inspiration, DIYs, recipes, and mood boards.
    Prompt Attributes: Emphasize creativity, inspiration, and how-to visuals.
    Example: "Illustration of a step-by-step DIY craft project, showcasing materials, and the final product, perfect for a Pinterest pin."
7. YouTube:
    Purpose: Long-form video content ranging from entertainment to tutorials.
    Prompt Attributes: Create thumbnails or visuals that encapsulate the video's theme and are attention-grabbing.
    Example: "Illustration of a person in front of a computer, with graphics of video editing tools around them, suitable for a YouTube tutorial on video editing."

When crafting prompts for each channel, always consider the platform's primary audience, content format, and purpose. Tailor your visuals to resonate with the users of that specific platform and align with the content type they expect to see.

Using the provided audience segmentation types, you can craft a detailed and targeted image prompt. Let's break down how to incorporate each segmentation type into the prompt:
1. Demographic Segmentation:
    Utilize outward-facing attributes to describe individuals or groups in the image.
    Example (based on hypothetical data): "A middle-aged married woman"
2. Behavioral Segmentation or Persona:
    Integrate actions or habits that resonate with the audience's behavior.
    Example (based on hypothetical data): "who frequently shops online, actively engages on social media, and enjoys mobile gaming on her tablet"
3. Psychographic or Attitudinal Segmentation:
    Infuse elements that align with the audience's interests, preferences, and values.
    Example (based on hypothetical data): "She has a preference for eco-friendly brands, enjoys mystery movies, and values sustainability and wellness."
4. **Geographic Segmentation:
    Set the scene in a location that matches the audience's geographic region.
    Example (based on hypothetical data): "She is situated in a cozy apartment in downtown Toronto, Canada."
 Final Prompt:
"A middle-aged married woman who frequently shops online, actively engages on social media, and enjoys mobile gaming on her tablet. She has a preference for eco-friendly brands, enjoys mystery movies, and values sustainability and wellness. She is situated in a cozy apartment in downtown Toronto, Canada."

This prompt provides a comprehensive view of the target audience, painting a vivid picture that encompasses demographic, behavioral, psychographic, and geographic attributes.

However, the granularity of the prompt will depend on the specificity of the data the user has provided. The more detailed the data, the more tailored the prompt can be, allowing for a more targeted image generation.

There are generic guidelines. Use the user-provided information and your expertise as an AI Assistant in generating good prompts for the generation of images with Dall-e or stable diffusion to help generate the same.

The user can provide additional information with user instructions for the CGS to generate images. This information may be derived from information about products, audiences, etc., configured by the user on DGS. In the example below, the information contains the product with a description of the customer, an audience definition with a description, and some good prompt examples that are relevant.

You are an AI Assistant who will help generate good image-generation prompts.

I sell the following products:
1. Barista-101—Espresso machine for home.
2. OffEspro-101—Espresso machine for office.
3. KidsChoc-101—Hot chocolate vending machine for kids.

Following are the descriptions of my audiences:
1. Goldstar—Home users from North America who use Barista-101 machines.
2. KidChamp—Kids from California who use KidsChoc-101
3. OffPro—Office users from New York who use OffEspro-101

Incorporate some key attributes or adjectives of the product in the prompt generated.

Incorporate some key attributes or adjectives of the audience in the prompt generated.

Some prompt examples below. Don't use the same as is but use them as inspiration:

Photo of [XM-Coffee-machine] on a wooden table, bakery in the background, streets of London elegant, perfect composition, perfect composition, beautiful detailed intricate, insanely detailed, 8k artistic photography, photorealistic, soft natural cinematic lighting.

In one example, the user prompt is a single-line goal, "I want to promote a home coffee machine for Halloween."

The prompt generated CGS is:

"A photo of the Barista-101 espresso machine, adorned with Halloween-themed decorations like cobwebs and mini pumpkins. The machine is set in a cozy North American home kitchen, with a steaming cup of espresso on the side. The atmosphere is warm and inviting, with soft lighting and autumnal colors, perfect for a Facebook post to engage with the Goldstar audience."

In one example, the CGS generated four images of the espresso machine based on this prompt.

In another example, the user prompt is "I want to promote office coffee machine for Christmas holidays targeting Instagram channel."

The prompt generated CGS is:

"A photo of the OffEspro-101 espresso machine, decorated with Christmas ornaments and twinkling fairy lights. The machine is placed in a bustling New York office setting, with a steaming cup of espresso and a plate of Christmas cookies on the side. The atmosphere is festive and energetic, with a beautifully decorated Christmas tree in the background. The image is vibrant and aesthetically pleasing, perfect for an Instagram post to engage with the OffPro audience."

In one example, the CGS generated four images of the espresso machine with holiday backgrounds based on this prompt.

In another example, the CGS generates an email for a marketing campaign. An example prompt template is as follows:

You are an AI Assistant that will help generate email for my email marketing campaign.

Creating an email for a marketing campaign requires gathering specific information from the user to ensure that the campaign is well-targeted and effective. Here's a structure for the brief, along with the inputs you should request from the user:

Below is an example structured template for a marketing email promoting a product for Halloween. Keep in mind that the specifics can be tailored to suit the company's brand voice, product features, and campaign goals.

Subject Line: Unlock Spooky Savings This Halloween with [Product Name]!

Preheader Text: Dive into the Halloween spirit! Enjoy exclusive deals on [Product Name] for a limited time.

[Email Header Image: A visually appealing and themed image showcasing the product.]

Hi [First Name],

[Introduction: Capture their attention and set the tone]

Get ready to make this Halloween spook-tacular with [Product Name]! Whether you're planning a haunted house extravaganza or a cozy night in, [Product Name] is the perfect companion for your festivities.

[Product Showcase: Highlight the product's key features and benefits]

Spooky Feature #1:[Brief description]
Spooky Feature #2:[Brief description]
Spooky Feature #3:[Brief description]

[Product Image]

With [Product Name], you're guaranteed an unforgettable Halloween experience, packed with [mention any specific benefits or features].

[Special Offer: Present the Halloween promotion or special deal]

For a limited time only, enjoy a frighteningly good discount of [X] % when you purchase [Product Name] using the code SPOOKYSAVINGS at checkout!

[Testimonials/Reviews: Share social proof]

But don't just take our word for it! Here's what our happy customers have to say about [Product Name]:

*"I can't imagine Halloween without [Product Name]. It totally transformed our celebration!"—[Customer Name]*

[Call-to-Action: Encourage them to take action]

Ready to elevate your Halloween? Click the button below to grab your [Product Name] at this exclusive price!

[CTA Button: "Shop Now" or "Get My Deal"]

[Additional Information: Provide any necessary details about the promotion]

This haunting deal won't last long—the clock strikes midnight on [Date], and the savings will vanish!

[Footer: Include contact information and legal compliance]

Stay spooky,
[Your Brand Name]
[Your Company's Physical Address]
[Unsubscribe Link]
[Optional: Social Media Links]
Connect with us:
[Social Media Icons/Links]

This structure aims to create a sense of excitement, highlight the product's benefits, provide social proof, and encourage immediate action, all while maintaining a festive Halloween theme. Ensure that the visuals, tone, and content align with your brand identity and resonate with your target audience.

Below is an example of user-provided information for generating the prompt:

You are an AI Assistant who will help generate good image-generation prompts.

I sell the following products:
1. Barista-101—Espresso machine for home.
2. OffEspro-101—Espresso machine for office.
3. KidsChoc-101—Hot chocolate vending machine for kids.

Following are the descriptions of my audiences:
1. Goldstar—Home users from North America who use Barista-101 machines.
2. KidChamp—Kids from California who use KidsChoc-101
3. OffPro—Office users from New York who use OffEspro-101

Incorporate some key attributes or adjectives of the product in the prompt generated.

Incorporate some key attributes or adjectives of the audience in the prompt generated.

Use the following brandkit information where appropriate
Normal font: Calibri
Header font: Calibri
Logo small: https://examplecompany.com/logo.png
Brand primary color pallet: #77DD7

Use the following email HTML template structure to fill up the relevant content. Make sure the header, footer, logo, and style are maintained as part of the generation

```
<html>
 <head>
  <img src https://examplecompany.com/logo.png>
 </head>
<body>
  <div>
    {{ fill this with the content of max 512 length on product description targeting the audience}}
  </div>
  <img src={{ AI Assistant fill the link to the image required in format -- https://cdn.typeface.ai?product='productname' & audience ='audience description' & prompt='a simple prompt to generate image with dale-3' &width=512&height=512 }}/>
  <div style='background-color:green'>
    {{ fill up call to action over here}}
  </div>
</body>
<footer>
  Copyright www.examplecompany.com
</footer>
</html>
```

Example output 1:
```
<html>
 <head>
  <img src="https://coffeemachineco.com/logo.png">
 </head>
 <body>
  <div>
   Hi [First Name],
   <p>
```

Transform your kitchen into a professional cafe this Halloween with Barista-101! Specially designed for coffee enthusiasts in North America, this espresso machine brings quality, efficiency, and the spirit of a barista right to your home.

```
   </p>
  </div>
  <img src="https://cdn.typeface.ai?product=Barista-101&audience=Home%20users%20from%20north%20America&prompt=Capture%20a%20spooky%20and%20festive%20scene%20with%20Barista-101%20perfectly%20brewing%20a%20cup%20of%20espresso,%20decorated%20with%20Halloween%20elements&width=512&height=512"/>
  <div style='background-color:green'>
   <p>
    Ready to brew like a pro? Click below to unlock your exclusive Halloween discount on Barista-101!
   </p>
   <button style='color:white'>Get My Deal</button>
  </div>
 </body>
 <footer>
  Copyright www.coffemachineco.com
 </footer>
</html>
```

Example output 2 for kids:
```
<html>
 <head>
  <img src="https://coffeemachineco.com/logo.png">
 </head>
 <body>
```

```
          <div>
            Hi [First Name],
          <p>
```

Make every coffee break a treat this Halloween with OffEspro-101! Designed for the fast-paced environment of New York offices, this espresso machine ensures a quick, smooth, and delightful coffee experience every time.

```
          </p>
          </div>
          <img src="https://cdn.typeface.ai?product=OffEspro-
101&audience=Office%20users%20from%20New%20York&prompt=Showcase%20OffEspro-
101%20in%20a%20busy%20office%20setting,%20decorated%20with%20Halloween%20eleme
nts, %20highlighting%20its%20efficiency%20and%20style&width=512&height=512"/>
            <div style='background-color:green'>
            <p>
            Upgrade your office coffee experience today! Click below to snag your OffEspro-
101 at an unbeatable Halloween price!
            </p>
            <button style='color:white'>Get My Deal</button>
          </div>
        </body>
        <footer>
        Copyright www.examplecompany.com
        </footer>
      </html>
```

Here is another example of a prompt template for generating a post for job recruiters to be posted on a social network or a jobs website:

```
        POST_HR = BasePromptBlueprint(
            task_description="Write a job post that recruiters would make for ${purpose}.",
            task_command="The job post that recruiters would make for ${purpose} is as
follows:",
            task_details=("Tailor your content to resonate with professionals, industry insiders,
potential hires, or partners."
                +("\n- Clearly state the post's purpose and benefits for connections. Include the
company details ${company_name}")
                +("\n- Acknowledge the two-second time frame to engage users, emphasizing the
need for a compelling headline.")
                +("\n- Address the potential intimidation of walls of text and advocate for using
short, easily digestible sentences.")
                +("\n\t"""Call to action:
                    % if cta:\n- Call to action with desired outcomes: ${cta}.\n% endif""")
                +("\n\t"""Sign Up Details:
                    % if sign_up:\n - Sign Up Details for the event:
                        ${sign_up}.\n% endif""")
                +("\n- Conclude the post effectively with a question, emphasizing increased
trending potential with more comments.")
            ),
            working_document=cleandoc("""${ content }\n"""),
            task_constraints=["Omit references to attached documents due to limitations.",
                "Rely only on content provided. Do not make up information.",
                "Limit the use of emojis to a maximum of 2.",
                "Ensure a professional tone and adhere to proper grammar and punctuation."
            ],
            output_structure="Use a top line header followed by the use of bullet points or
numbered lists, as this will grab attention and break up the text, meaning viewers can engage
with what you have to say without losing much time.",
            Config={
                "essential_task_vars": ["content", "purpose", "company_name"],
                "optional_task_vars": ["cta","sign_up"]
            }
        )
```

After the generated item 1016 is generated, an optional operation 1018 of content postprocessing may be performed to modify or block the newly generated item 1016, resulting in a processed new item 1020. The generated item 1016 may be post-processed for various reasons, including improving accuracy and consistency (e.g., checking for factual errors, grammatical mistakes, or inconsistencies in style or format); enhancing quality and relevance (e.g., removing irrelevant or redundant content, improving coherence and flow, ensure that the output aligns with the intended purpose); enhancing output (e.g., polish wording, improve images, ensure that the style matches the desired effect); personalizing the newly generated item 1016; and ensuring ethical and responsible use.

The generated item 1016 is new content, and it does not refer to content that is the result of editing or changing existing material (e.g., editing an image to include text within is not considered GAI-generated new content). One difference between the generated item 1016 and material created with editing tools is that the newly generated item 1016 is entirely new content, while the editing tool modifies existing content or creates the content one instruction at a time. Another difference is that the GAI model 1012 can produce highly creative and imaginative content, while editing tools focus on enhancing the existing content based on user commands. Another difference is that the GAI model 1012 can generate content rapidly, while the editing tools require more time and effort for thorough editing and refinement.

Figure 11:
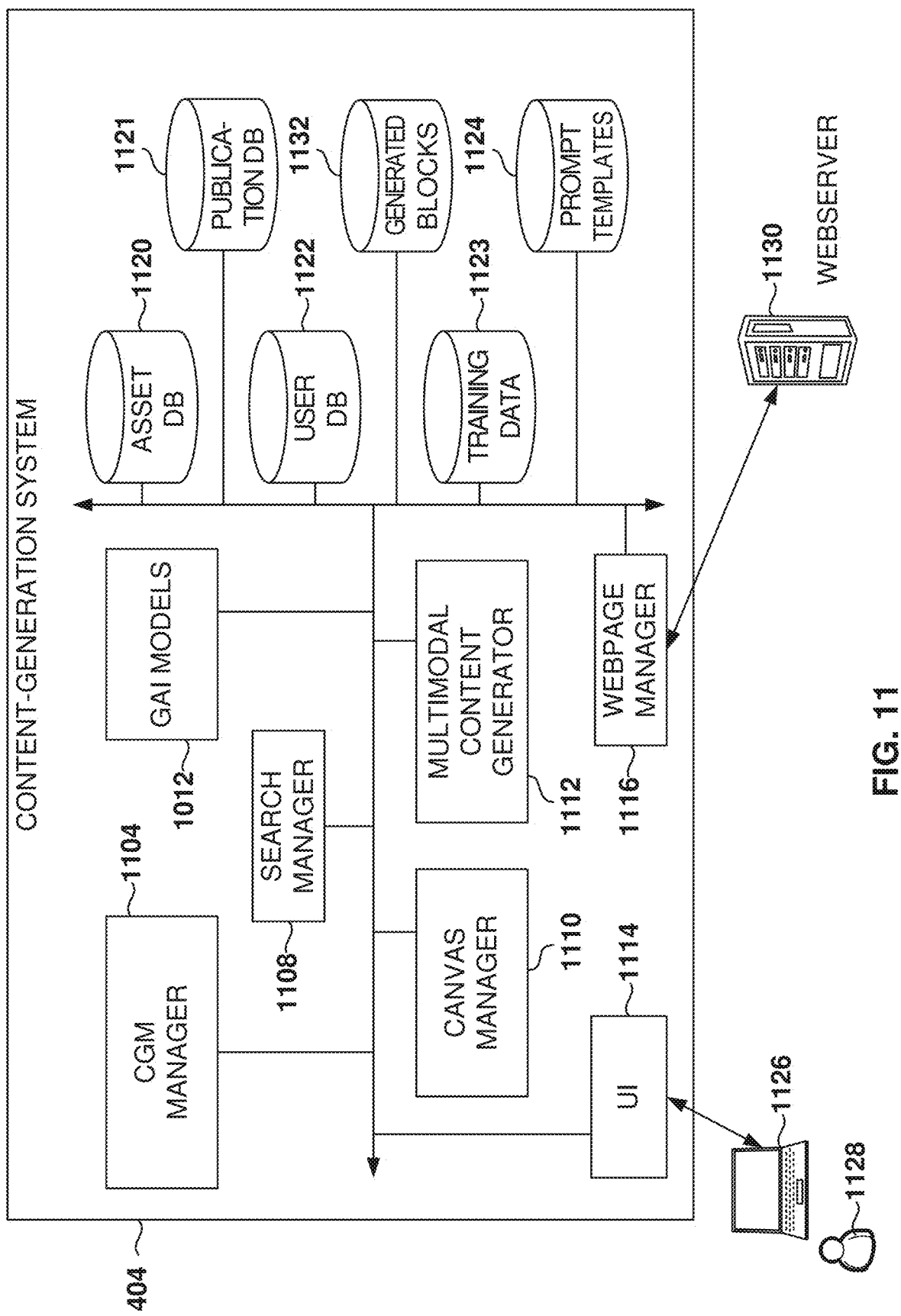
FIG. 11 illustrates a content-generation system (CGM) for implementing example embodiments, according to some example embodiments.

FIG. 11 illustrates a content-generation system 404 for implementing example embodiments, according to some example embodiments. The content-generation system 404 includes a CGM manager 1104, the tune 1014, a search manager 1108, a canvas manager 1110, a multimodal content generator 1112, a UI 1114, a webpage manager 1116, and a plurality of databases (DB) that include a product DB 1120, a publication DB 1121, a user DB 1122, generated blocks DB 1132, training data 1123, and prompt templates 1124.

Although a single system is presented, the person skilled in the art will readily appreciate that implementation may be distributed over one or more devices and be implemented over a network.

The CGM manager 1104 manages the interactions between the different modules of the content-generation system 404. The search manager 1108 performs searches in response to user requests. The canvas manager 1110 implements tools for users, such as the canvas of FIG. 1, and interfaces with the UI 1114 to present the canvas on a display of user device 1126. The multimodal content generator 1112 generates content for the presentation on the webpage utilizing the GAI models 1012, and the UI 1114 interacts with the user device 1126, associated with the user 1128 (e.g., requester), to present the UI on the display of the user device 1126.

The webpage manager 1116 interfaces with a webserver 1130 that hosts a customer's website and gets the website's content as needed for content indexing and processing as well as presentation on the user device 1126.

The product DB 1120 includes information on products the customer is selling. It includes the products discovered by exploring the website, although additional product information may also be added by the customer to the product DB 1120.

The publication DB 1121 includes the information associated with publications created or presented to end-users (e.g., webpages, emails). The user DB 1122 includes user information. The generated blocks DB 1132 include the blocks used in publications generated by the CGS 404, where a publication may include one or more blocks.

The training data 1123 includes data for fine-tuning the GAI models, and the prompt templates 1124 includes the prompt templates used for creating prompts for the GAI models 1012. The content-generation system 404 can pregenerate personalized content or create the content on the fly, with low latency.

Figure 12:
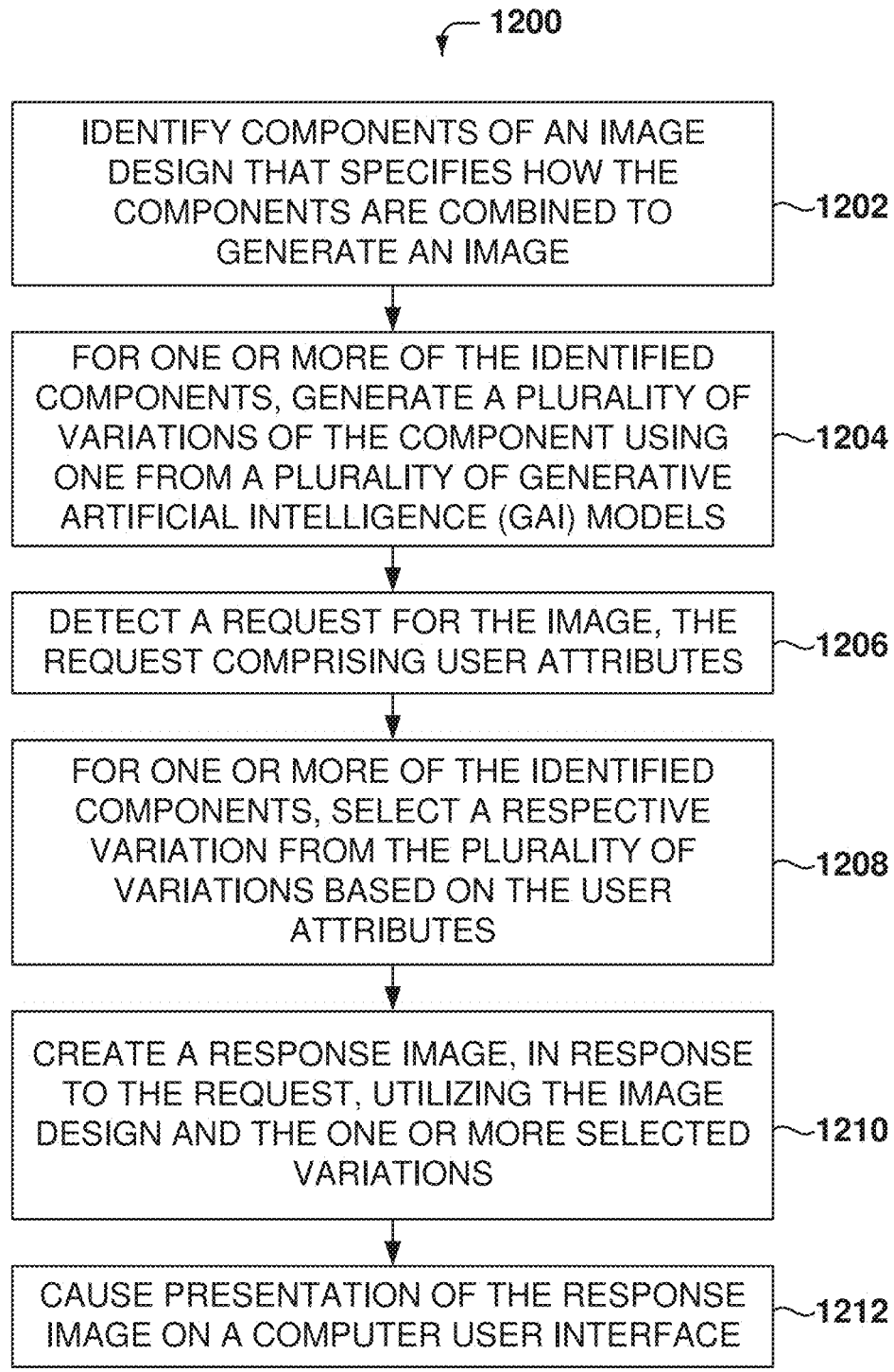
FIG. 12 is a flowchart of a method for utilizing pre-generated content to create a publication, according to some examples.

FIG. 12 is a flowchart of a method for utilizing pregenerated content to create a publication, according to some examples. While the various operations in this flowchart are presented and described sequentially, one of ordinary skill will appreciate that some or all of the operations may be executed in a different order, be combined or omitted, or be executed in parallel.

Operation 1202 is for identifying components of an image design that specifies how the components are combined to generate an image.

From operation 1202, the method 1200 flows to operation 1204 to generate, for one or more of the identified components, a plurality of variations of the component using one from a plurality of (GAI) models.

From operation 1204, the method 1200 flows to operation 1206 for detecting a request for the image, the request comprising user attributes.

From operation 1206, the method 1200 flows to operation 1208 for selecting, for one or more of the identified components, a respective variation from the plurality of variations based on the user attributes.

From operation 1208, the method 1200 flows to operation 1210 to create a response image, in response to the request, utilizing the image design and the one or more selected variations.

From operation 1210, the method 1200 flows to operation 1212 for causing presentation of the response image on a computer user interface.

In one example, generating a plurality of variations further comprises generating a prompt for each variation with instructions for creating the variation, and utilizing the generated prompt for each variation as input to one of the GAI models.

In one example, a first component is for an image of an asset, where generating the plurality of variations comprises generating variations of the image of the asset.

In one example, a second component is for a background, where generating the plurality of variations comprises generating variations of backgrounds.

In one example, a third component is for a text block, where generating the plurality of variations comprises generating a plurality of text blocks.

In one example, the variations are pregenerated independently of a user request, wherein the generated variations are associated with different user attributes.

In one example, the method 1200 further comprises generating, for one or more of the identified components, the component in response to the request, the generating being based on one or more of the user attributes.

In one example, the method 1200 further comprises generating a prompt based on the user attributes in the request, where the prompt is used as input to one of the GAI models to generate the component.

In one example, creating a response image includes combining pregenerated variations and components generated in response to the request.

In one example, the request is for a publication that includes the image, and the method 1200 further comprises creating the publication by including the response image, where causing presentation of the response image comprises presenting the publication in the computer user interface.

Given the disclosure above, various examples are set forth below. It should be noted that one or more features of an example, taken in isolation or combination, should be considered within the disclosure of this application.

Another general aspect is for a system that includes a memory comprising instructions and one or more computer processors. The instructions, when executed by the one or more computer processors, cause the one or more computer processors to perform operations comprising: identifying components of an image design that specifies how the components are combined to generate an image; for one or more of the identified components, generating a plurality of variations of the component using one from a plurality of generative artificial intelligence (GAI) models; detecting a request for the image, the request comprising user attributes; for one or more of the identified components, selecting a respective variation from the plurality of variations based on the user attributes; creating a response image, in response to the request, utilizing the image design and the one or more selected variations; and causing presentation of the response image on a computer user interface.

In yet another general aspect, a non-transitory machine-readable storage medium (e.g., a non-transitory storage medium) includes instructions that, when executed by a machine, cause the machine to perform operations comprising: identifying components of an image design that specifies how the components are combined to generate an image; for one or more of the identified components, generating a plurality of variations of the component using one from a plurality of generative artificial intelligence (GAI) models; detecting a request for the image, the request comprising user attributes; for one or more of the identified components, selecting a respective variation from the plurality of variations based on the user attributes; creating a response image, in response to the request, utilizing the image design and the one or more selected variations; and causing presentation of the response image on a computer user interface.

Figure 13:
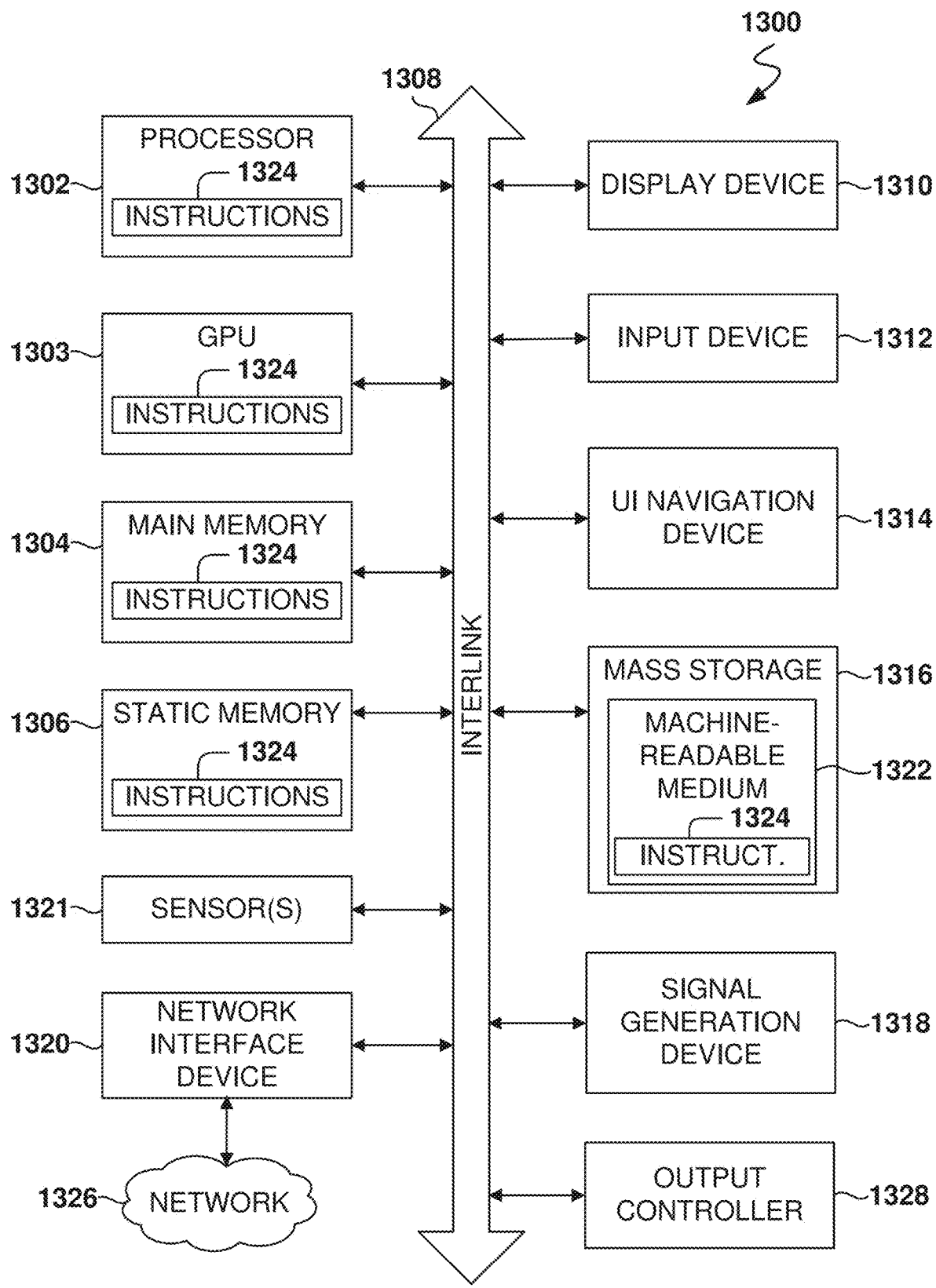
FIG. 13 is a block diagram illustrating an example of a machine upon or by which one or more example process embodiments described herein may be implemented or controlled.

FIG. 13 is a block diagram illustrating an example of a machine 1300 upon or by which one or more example process embodiments described herein may be implemented or controlled. In alternative embodiments, the machine 1300 may operate as a standalone device or be connected (e.g., networked) to other machines. In a networked deployment, the machine 1300 may operate in the capacity of a server machine, a client machine, or both in server-client network environments. In an example, the machine 1300 may act as a peer machine in a peer-to-peer (P2P) (or other distributed) network environment. Further, while only a single machine 1300 is illustrated, the term "machine" shall also be taken to include any collection of machines that individually or jointly execute a set (or multiple sets) of instructions to perform any one or more of the methodologies discussed herein, such as via cloud computing, software as a service (Saas), or other computer cluster configurations.

Examples, as described herein, may include, or may operate by, logic, various components, or mechanisms. Circuitry is a collection of circuits implemented in tangible entities, including hardware (e.g., simple circuits, gates, logic). Circuitry membership may be flexible over time and underlying hardware variability. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits), including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other circuitry components when the device operates. In an example, any of the physical components may be used in more than one member of more than one circuitry. For example, under operation, execution units may be used in a first circuit of a first circuitry at one point in time and reused by a second circuit in the first circuitry or by a third circuit in a second circuitry at a different time.

The machine 1300 (e.g., computer system) may include a hardware processor 1302 (e.g., a central processing unit (CPU), a hardware processor core, or any combination thereof), a graphics processing unit (GPU 1303), a main memory 1304, and a static memory 1306, some or all of which may communicate with each other via an interlink 1308 (e.g., bus). The machine 1300 may further include a display device 1310, an alphanumeric input device 1312 (e.g., a keyboard), and a user interface (UI) navigation device 1314 (e.g., a mouse). In an example, the display device 1310, alphanumeric input device 1312, and UI navigation device 1314 may be a touch screen display. The machine 1300 may additionally include a mass storage device 1316 (e.g., drive unit), a signal generation device 1318 (e.g., a speaker), a network interface device 1320, and one or more sensors 1321, such as a Global Positioning System (GPS) sensor, compass, accelerometer, or another sensor. The machine 1300 may include an output controller 1328, such as a serial (e.g., universal serial bus (USB)), parallel, or other wired or wireless (e.g., infrared (IR), near field communication (NFC)) connection to communicate with or control one or more peripheral devices (e.g., a printer, card reader).

The processor 1302 refers to any one or more circuits or virtual circuits (e.g., a physical circuit emulated by logic executing on an actual processor) that manipulates data values according to control signals (e.g., commands, opcodes, machine code, control words, macroinstructions, etc.) and which produces corresponding output signals that are applied to operate a machine. A processor 1302 may, for example, include at least one of a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), a Field Programmable Gate Array (FPGA), a Radio-Frequency Integrated Circuit (RFIC), a Neuromorphic Processor, a Quantum Processor, or any combination thereof.

The processor 1302 may further be a multi-core processor having two or more independent processors (sometimes referred to as "cores") that may execute instructions contemporaneously. Multi-core processors contain multiple computational cores on a single integrated circuit die, each of which can independently execute program instructions in parallel. Parallel processing on multi-core processors may be implemented via architectures like superscalar, VLIW, vector processing, or SIMD that allow each core to run separate instruction streams concurrently. The processor 1302 may be emulated in software, running on a physical processor, as a virtual processor or virtual circuit. The virtual processor may behave like an independent processor but is implemented in software rather than hardware.

The mass storage device 1316 may include a machine-readable medium 1322 on which one or more sets of data structures or instructions 1324 (e.g., software) embodying or utilized by any of the techniques or functions described herein. The instructions 1324 may also reside, completely or at least partially, within the main memory 1304, within the static memory 1306, within the hardware processor 1302, or the GPU 1303 during execution thereof by the machine 1300. For example, one or any combination of the hardware processor 1302, the GPU 1303, the main memory 1304, the static memory 1306, or the mass storage device 1316 may constitute machine-readable media.

While the machine-readable medium 1322 is illustrated as a single medium, the term "machine-readable medium" may include a single medium or multiple media (e.g., a centralized or distributed database and associated caches and servers) configured to store one or more instructions 1324.

The term "machine-readable medium" may include any medium that is capable of storing, encoding, or carrying instructions 1324 for execution by the machine 1300 and that causes the machine 1300 to perform any one or more of the techniques of the present disclosure or that is capable of storing, encoding, or carrying data structures used by or associated with such instructions 1324. Non-limiting machine-readable medium examples may include solid-state memories and optical and magnetic media. For example, a massed machine-readable medium comprises a machine-readable medium 1322 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1324 may be transmitted or received over a communications network 1326 using a transmission medium via the network interface device 1320.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented separately. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Additionally, as used in this disclosure, phrases of the form "at least one of an A, a B, or a C," "at least one of A, B, and C," and the like should be interpreted to select at least one from the group that comprises "A, B, and C." Unless explicitly stated otherwise in connection with a particular instance, in this disclosure, this manner of phrasing does not mean "at least one of A, at least one of B, and at least one of C." As used in this disclosure, the example "at least one of an A, a B, or a C" would cover any of the following selections: {A}, {B}, {C}, {A, B}, {A, C}, {B, C}, and {A, B, C}.

Moreover, plural instances may be provided for resources, operations, or structures described herein as a single instance. Additionally, boundaries between various resources, operations, modules, engines, and data stores are somewhat arbitrary, and particular operations are illustrated in the context of specific illustrative configurations. Other allocations of functionality are envisioned and may fall within the scope of various embodiments of the present disclosure. In general, structures and functionality are presented as separate resources in the example; configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. Accordingly, the specification and drawings are to be regarded in an illustrative rather than a restrictive sense.

What is claimed is:

1. A computer-implemented method comprising:
   identifying components of an image design that specifies how the components are combined to generate an image;
   for one or more of the identified components, generating a plurality of variations of the component using one from a plurality of generative artificial intelligence (GAI) models;
   detecting a request for the image, the request comprising user attributes;
   for one or more of the identified components, selecting a respective variation from the plurality of variations based on the user attributes;
   creating a response image, in response to the request, utilizing the image design and the one or more selected variations; and
   causing presentation of the response image on a computer user interface.

2. The method as recited in claim 1, wherein generating a plurality of variations further comprises:
   generating a prompt for each variation with instructions for creating the variation; and
   utilizing the generated prompt for each variation as input to one of the GAI models.

3. The method as recited in claim 1, wherein a first component is for an image of an asset, wherein generating the plurality of variations comprises generating variations of the image of the asset.

4. The method as recited in claim 1, wherein a second component is for a background, wherein generating the plurality of variations comprises generating variations of backgrounds.

5. The method as recited in claim 1, wherein a third component is for a text block, wherein generating the plurality of variations comprises generating a plurality of text blocks.

6. The method as recited in claim 1, wherein the variations are pregenerated independently of a user request, wherein the generated variations are associated with different user attributes.

7. The method as recited in claim 1, further comprising:
for one or more of the identified components, generating the component in response to the request, the generating being based on one or more of the user attributes.

8. The method as recited in claim 7, further comprising: generating a prompt based on the user attributes in the request, wherein the prompt is used as input to one of the GAI models to generate the component.

9. The method as recited in claim 1, wherein creating a response image includes combining pregenerated variations and components generated in response to the request.

10. The method as recited in claim 1, wherein the request is for a publication that includes the image, the method further comprising:
creating the publication by including the response image, wherein causing presentation of the response image comprises presenting the publication in the computer user interface.

11. A system comprising:
a memory comprising instructions; and
one or more computer processors, wherein the instructions, when executed by the one or more computer processors, cause the system to perform operations comprising:
identifying components of an image design that specifies how the components are combined to generate an image;
for one or more of the identified components, generating a plurality of variations of the component using one from a plurality of generative artificial intelligence (GAI) models;
detecting a request for the image, the request comprising user attributes;
for one or more of the identified components, selecting a respective variation from the plurality of variations based on the user attributes;
creating a response image, in response to the request, utilizing the image design and the one or more selected variations; and
causing presentation of the response image on a computer user interface.

12. The system as recited in claim 11, wherein generating a plurality of variations further comprises:
generating a prompt for each variation with instructions for creating the variation; and
utilizing the generated prompt for each variation as input to one of the GAI models.

13. The system as recited in claim 11, wherein a first component is for an image of an asset, wherein generating the plurality of variations comprises generating variations of the image of the asset.

14. The system as recited in claim 11, wherein a second component is for a background, wherein generating the plurality of variations comprises generating variations of backgrounds.

15. The system as recited in claim 11, wherein a third component is for a text block, wherein generating the plurality of variations comprises generating a plurality of text blocks.

16. A non-transitory machine-readable storage medium including instructions that, when executed by a machine, cause the machine to perform operations comprising:
identifying components of an image design that specifies how the components are combined to generate an image;
for one or more of the identified components, generating a plurality of variations of the component using one from a plurality of generative artificial intelligence (GAI) models;
detecting a request for the image, the request comprising user attributes;
for one or more of the identified components, selecting a respective variation from the plurality of variations based on the user attributes;
creating a response image, in response to the request, utilizing the image design and the one or more selected variations; and
causing presentation of the response image on a computer user interface.

17. The non-transitory machine-readable storage medium as recited in claim 16, wherein generating a plurality of variations further comprises:
generating a prompt for each variation with instructions for creating the variation; and
utilizing the generated prompt for each variation as input to one of the GAI models.

18. The non-transitory machine-readable storage medium as recited in claim 16, wherein a first component is for an image of an asset, wherein generating the plurality of variations comprises generating variations of the image of the asset.

19. The non-transitory machine-readable storage medium as recited in claim 16, wherein a second component is for a background, wherein generating the plurality of variations comprises generating variations of backgrounds.

20. The non-transitory machine-readable storage medium as recited in claim 16, wherein a third component is for a text block, wherein generating the plurality of variations comprises generating a plurality of text blocks.

* * * * *